United States Patent
Okuyama et al.

(10) Patent No.: US 10,174,255 B2
(45) Date of Patent: Jan. 8, 2019

(54) THERMOSETTING COMPOSITION WITH PHOTO-ALIGNMENT PROPERTY, ALIGNMENT LAYER, SUBSTRATE WITH ALIGNMENT LAYER, RETARDATION PLATE, AND DEVICE

(71) Applicant: DAI NIPPON PRINTING CO., LTD., Tokyo-to (JP)

(72) Inventors: Ken-ichi Okuyama, Tokyo-to (JP); Mami Motooka, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 204 days.

(21) Appl. No.: 15/118,055

(22) PCT Filed: Feb. 4, 2015

(86) PCT No.: PCT/JP2015/053143
§ 371 (c)(1),
(2) Date: Aug. 10, 2016

(87) PCT Pub. No.: WO2015/122336
PCT Pub. Date: Aug. 20, 2015

(65) Prior Publication Data
US 2016/0348004 A1 Dec. 1, 2016

(30) Foreign Application Priority Data
Feb. 13, 2014 (JP) .................................. 2014-025949

(51) Int. Cl.
C09K 19/56 (2006.01)
C08F 12/22 (2006.01)
(Continued)

(52) U.S. Cl.
CPC .............. *C09K 19/56* (2013.01); *C08F 12/22* (2013.01); *C08F 12/24* (2013.01); *C08F 12/32* (2013.01);
(Continued)

(58) Field of Classification Search
CPC ............... C09K 19/56; C02F 1/133711; C02F 1/133788; C02F 1/13378; C08F 12/04;
(Continued)

(56) References Cited

U.S. PATENT DOCUMENTS 6,316,165 B1    11/2001  Pavelchek et al.
2003/0087045 A1*  5/2003  Nakata .................. C09K 19/56
                                                    428/1.27
(Continued)

FOREIGN PATENT DOCUMENTS

JP      2000-294504    10/2000
JP      2006-511686    4/2006
(Continued)

OTHER PUBLICATIONS

Notice of Reasons for Refusal issued in Japanese Patent Application No. 2014-083070, dated Jun. 17, 2014, 12 pages with partial translation.

*Primary Examiner* — Ruiyun Zhang
(74) *Attorney, Agent, or Firm* — Hamre, Schumann, Mueller & Larson, P.C.

(57) ABSTRACT

An embodiment of the present invention provides a thermosetting composition with a photo-alignment property, including a copolymer containing a photo-alignment constitutional unit, and a thermal cross-linking constitutional unit in which a thermal cross-linking group is bonded via a straight-chain alkylene group with a carbon number of 4 to 11, or via a polyethylene glycol group with a cycle number of 2 to 5.

14 Claims, 1 Drawing Sheet

(51) Int. Cl.
| | |
|---|---|
| *C08F 12/24* | (2006.01) |
| *C08F 12/32* | (2006.01) |
| *C08F 212/14* | (2006.01) |
| *C08F 220/30* | (2006.01) |
| *G02F 1/13363* | (2006.01) |
| *G02B 5/30* | (2006.01) |
| *G02F 1/1337* | (2006.01) |
| *C08F 220/28* | (2006.01) |
| *C08F 222/20* | (2006.01) |
| *C08F 222/22* | (2006.01) |

(52) U.S. Cl.
CPC ........ *C08F 212/14* (2013.01); *C08F 212/145* (2013.01); *C08F 220/28* (2013.01); *C08F 220/30* (2013.01); *C08F 222/20* (2013.01); *C08F 222/22* (2013.01); *G02B 5/30* (2013.01); *G02B 5/3083* (2013.01); *G02F 1/13363* (2013.01); *G02F 1/133788* (2013.01); *C08F 2220/281* (2013.01); *Y10T 428/10* (2015.01); *Y10T 428/1005* (2015.01)

(58) Field of Classification Search
CPC ........ C08F 12/08; C08F 12/34; C08F 212/14; C08F 212/34; C08F 220/30; G02B 5/30; G02B 5/308; Y10T 428/10; Y10T 428/1005; G02F 1/133711; G02F 1/133788; G02F 1/13378

USPC .......... 428/1.1, 1.2; 349/127, 130, 132, 134, 349/135

See application file for complete search history.

(56) References Cited

U.S. PATENT DOCUMENTS

| | | |
|---|---|---|
| 2005/0288426 A1 | 12/2005 | Studer et al. |
| 2012/0082805 A1 | 4/2012 | Hatanaka et al. |
| 2012/0114879 A1 | 5/2012 | Hatanaka et al. |
| 2012/0165491 A1 | 6/2012 | Ootsuki et al. |
| 2013/0029087 A1 | 1/2013 | Hatanaka et al. |
| 2015/0253631 A1* | 9/2015 | Hatanaka ............... G02B 5/201 |
| | | 428/195.1 |

FOREIGN PATENT DOCUMENTS

| | | | |
|---|---|---|---|
| JP | 4094764 B | 6/2008 | |
| JP | 4207430 B | 1/2009 | |
| JP | 2009-181104 | 8/2009 | |
| JP | 2012-033909 | 2/2012 | |
| JP | 2012-087286 | 5/2012 | |
| TW | 201223979 | 6/2012 | |
| WO | 2010/150748 | 12/2010 | |
| WO | 2011/010635 | 1/2011 | |
| WO | 2011/126022 | 10/2011 | |
| WO | WO-2014042216 A1 * | 3/2014 | ............. G02B 5/201 |

* cited by examiner

THERMOSETTING COMPOSITION WITH PHOTO-ALIGNMENT PROPERTY, ALIGNMENT LAYER, SUBSTRATE WITH ALIGNMENT LAYER, RETARDATION PLATE, AND DEVICE

TECHNICAL FIELD

The present disclosure relates to a thermosetting composition with a photo-alignment property, which is used for an alignment layer.

BACKGROUND ART

With regard to a liquid crystal, diverse applications to various kinds of optical elements such as a retardation plate and a polarizing plate except a liquid crystal display element have been studied by utilizing an alignment property and anisotropy of physical properties such as refractive index, dielectric constant and magnetic susceptibility.

An alignment layer is used for aligning a liquid crystal. A rubbing method and a photo-alignment method are known as examples of a formation method for an alignment layer, and the photo-alignment method is useful in view of being capable of controlling quantitative alignment treatment by reason of no occurrence of static electricity and dust as a problem of the rubbing method (refer to Patent Document 1, for example).

Thermal stability and solvent resistance except liquid crystal alignment ability are required for an alignment layer. For example, the alignment layer is occasionally exposed to heat and solvents in the production process of various kinds of devices, and to high temperature during the use of various kinds of devices. The exposure of the alignment layer to high temperature brings a possibility of remarkably deteriorating liquid crystal alignment ability.

Then, for example, in Patent Document 2, in order to obtain stable liquid crystal alignment ability, a liquid crystal alignment agent containing a polymer component having a structure capable of a cross-inking reaction by light and a structure which cross-links by heat, and a liquid crystal alignment agent containing a polymer component having a structure capable of a cross-inking reaction by light and a compound having a structure which cross-links by heat are proposed.

Also, in Patent Document 3, in order to obtain excellent liquid crystal alignment ability, sufficient thermal stability, high solvent resistance and high transparency, a thermosetting film forming composition having a photo-alignment property, containing (A) an acrylic copolymer having a photo-dimerization site and a thermal cross-linking site and (B) a cross-linking agent, is proposed. (B) The cross-linking agent bonds to a thermal cross-linking site of (A) the acrylic copolymer, and the thermosetting film forming composition having a photo-alignment property is cured by heating to form a cured film, and then an alignment layer may be formed by irradiating the cured film with polarized ultraviolet rays.

In Patent Document 4, in order to obtain excellent liquid crystal alignment ability, sufficient thermal stability, high solvent resistance and high transparency, a thermosetting film forming composition having a photo-alignment property, containing (A) an acrylic copolymer having a photo-dimerization site and a thermal cross-linking site, (B) an acrylic polymer having at least one of predetermined alkyl ester group and hydroxyalkyl ester group, and at least one of a carboxyl group and a phenolic hydroxy group, and (C) a cross-linking agent, is proposed. (C) The cross-linking agent bonds to a thermal cross-linking site of (A) the acrylic copolymer and to a carboxyl group and a phenolic hydroxy group of (B) the acrylic polymer, and the thermosetting film forming composition having a photo-alignment property is cured by heating to form a cured film, and then an alignment layer may be formed by irradiating the cured film with polarized ultraviolet rays.

In Patent Document 5, in order to obtain excellent liquid crystal alignment ability, sufficient thermal stability, high solvent resistance and high transparency, a thermosetting film forming composition having a photo-alignment property, containing (A) a compound having a photo-alignment group and a hydroxy group, (B) a polymer having at least one of a hydroxy group and a carboxyl group, and (C) a cross-linking agent, is proposed. (C) The cross-linking agent bonds to a hydroxy group of (A) the compound and to a hydroxy group and a carboxyl group of (B) the polymer, and the thermosetting film forming composition having a photo-alignment property is cured by heating to form a cured film, and then an alignment layer may be formed by irradiating the cured film with polarized ultraviolet rays.

Also, in Patent Document 6, a composition for a photo alignment film containing an azo compound having a polymerizable functional group is disclosed. The composition for a photo alignment film may be polymerized by light or heat.

In Patent Document 7, a copolymer being a cross-linkable photoactive polymer comprising (a) at least one monomer from the group of acrylate, methacrylate, acrylamide, and methacrylamide, in which photochemically isomerizable molecules or dimerizable molecules are bonded covalently or directly, or bonded via a cross-linking group, (b) at least one comonomer containing a hydroxy group, and (c) another ethylenically unsaturated comonomer as the case may be, is disclosed. The copolymer may be polymerized by light or heat.

CITATION LIST

Patent Documents

Patent Document 1: Japanese Patent No. (JP-B) 4094764
Patent Document 2: JP-B 4207430
Patent Document 3: WO 2010/150748
Patent Document 4: WO 2011/010635
Patent Document 5: WO 2011/126022
Patent Document 6: Japanese Patent Application Laid-Open No. (JP-A) 2009-181104
Patent Document 7: Japanese Unexamined Patent Publication No. 2006-511686

SUMMARY

Technical Problem

In these manners, thermal curing is proposed for improving thermal stability and solvent resistance of an alignment layer.

Meanwhile, in recent years, in view of lightness, thinness, flexibility, and productivity, a resin film has been used for a substrate such as various optical elements and liquid crystal display elements, instead of using a material such as a glass substrate. However, a resin film is less excellent in thermal stability compared with a glass substrate, so that the size and shape of the resin film changes when the heating temperature during formation of the alignment layer is high, and thus deviation is caused in alignment direction of the alignment layer to decrease liquid crystal alignment ability. As the result, in various optical elements using the alignment layer, optical properties are deteriorated due to the occurrence of deviation in optical axis.

In addition, also from the viewpoint of energy saving, a low-temperature curable material for an alignment layer is demanded.

The present disclosure has been made in view of the problem, and an objective thereof is to provide a thermosetting composition with a photo-alignment property, which may form an alignment layer excellent in stability of liquid crystal alignment ability and may be cured by low temperature, and provide an alignment layer, a substrate with the alignment layer, a retardation plate and a device using the thermosetting composition.

Solution to Problem

To achieve the above object, an embodiment of the present invention provides a thermosetting composition with a photo-alignment property, comprising a copolymer containing a photo-alignment constitutional unit, and a thermal cross-linking constitutional unit in which a thermal cross-linking group is bonded via a straight-chain alkylene group with a carbon number of 4 to 11, or via a polyethylene glycol group with a cycle number of 2 to 5.

According to an embodiment of the present invention, a copolymer containing a thermal cross-linking constitutional unit in which a thermal cross-linking group is bonded via the predetermined straight-chain alkylene group or polyethylene glycol group allows a thermosetting composition with a photo-alignment property with favorable thermosetting properties and low-temperature curability. Thus, in the case an alignment layer is formed on a substrate by using the thermosetting composition with a photo-alignment property of an embodiment of the present invention, changes in size and shape of the substrate due to heat may be inhibited so as to improve stability of liquid crystal alignment ability, thermal stability, and solvent resistance. Accordingly, in the case of using the alignment layer for various optical elements, deviation in optical axis may be inhibited so that favorable optical properties may be obtained.

Also, the thermosetting composition with a photo-alignment property of an embodiment of the present invention is to be used for an alignment layer of a liquid crystal, wherein the thermal cross-linking constitutional unit contains a constitutional unit represented by the following formula (1):

[Chemical Formula 1]

(1)

(In the formula (1), Z1 is a monomer unit as follows:

[Chemical Formula 2]

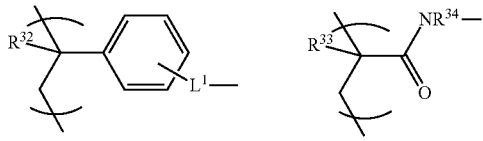

-continued

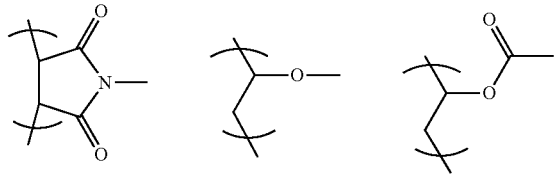

[In the formula, R32 represents a hydrogen atom or a methyl group, L1 represents a single bond, an ether linkage, a thioether linkage, an ester linkage, a thioester linkage, a carbonyl linkage, or a thiocarbonyl linkage, R33 represents a hydrogen atom, a methyl group, a chlorine atom, or a phenyl group, R34 represents a hydrogen atom or a lower alkyl group. Incidentally, when L1 is a single bond, Y1 is directly bonded to a styrene skeleton.] Also, in the formula (1), Y1 represents the straight-chain alkylene group or the polyethylene glycol group.) and, the thermal cross-linking group is preferably bonded to a constitutional unit Z1 in the formula (1) via Y1 in the formula (1).

In the above case, the thermal cross-linking group is preferably selected from the group consisting of a hydroxy group, a carboxy group, a mercapto group, a glycidyl group, and an amide group.

The thermosetting composition with a photo-alignment property of an embodiment of the present invention preferably further comprises a cross-linking agent. The reason therefor is to improve thermal stability and solvent resistance.

Also, in an embodiment of the present invention, the thermal cross-linking group is preferably a hydroxy group. Further, the thermal cross-linking constitutional unit preferably contains —(CH2)n-OH or —(C2H4O)m-H, provided that "n" is 4 to 11 and "m" is 2 to 5. The reason therefor is that reactivity is high in a hydroxy group, especially in an aliphatic hydroxy group.

Further, in an embodiment of the present invention, the photo-alignment group of the photo-alignment constitutional unit is preferably a functional group for causing a photo-dimerization reaction or a photo-isomerization reaction. Also, the photo-alignment group is preferably a cinnamoyl group. These photo-alignment groups have advantages that sensitivity to light is comparatively high and the range of material selection is wide.

Further, an embodiment of the present invention provides an alignment layer comprising a copolymer including a photo-alignment constitutional unit, a thermal cross-linking constitutional unit in which a thermal cross-linking group is bonded via a straight-chain alkylene group with a carbon number of 4 to 11 or via a polyethylene glycol group with a cycle number of 2 to 5, and a cross-linking structure, and the alignment layer comprising a photo-dimerization structure or a photo-isomerization structure of a photo-alignment group in the photo-alignment constitutional unit.

According to an embodiment of the present invention, the predetermined copolymer is contained so as to allow low temperature curing and the alignment layer excellent in stability of liquid crystal alignment ability.

Further, the alignment layer in an embodiment of the present invention is for a liquid crystal, and preferably, the thermal cross-linking constitutional unit contains a constitutional unit represented by the formula (1), the thermal cross-linking group is bonded to a constitutional unit Z1 in the formula (1) via Y1 in the formula (1), and the photo-alignment group of the photo-alignment constitutional unit includes the photo-dimerization structure or the photo-isomerization structure.

In the above case, the thermal cross-linking group is preferably the one selected from the group consisting of a hydroxy group, a carboxy group, a mercapto group, a glycidyl group, and an amide group.

Also, an embodiment of the present invention provides a substrate with an alignment layer comprising a substrate, and the alignment layer disposed on the substrate and formed from the thermosetting composition with a photo-alignment property.

According to an embodiment of the present invention, the alignment layer is an alignment layer formed from the thermosetting composition with a photo-alignment property or the alignment layer described above, so as to allow the alignment layer excellent instability of liquid crystal alignment ability, thermal stability, and solvent resistance.

In the embodiment of the present invention, the substrate is preferably a resin substrate. The above-described thermosetting composition with a photo-alignment property is capable of being cured by low temperature so that wrinkles and stretches of a resin substrate caused by heat may be inhibited even in the case of using the resin substrate with not so high thermal stability, and thus liquid crystal alignment ability may be stably obtained.

In addition, an embodiment of the present invention provides a retardation plate comprising the substrate with an alignment layer described above and a retardation layer formed on the alignment layer of the substrate with the alignment layer.

According to an embodiment of the present invention, the substrate with the alignment layer described above allow the retardation plate which is excellent in stability of liquid crystal alignment ability, thermal stability, and solvent resistance, and favorable in optical properties to be obtained.

Further, an embodiment of the present invention provides a device comprising an alignment layer formed from the thermosetting composition with a photo-alignment property or the alignment layer described above.

According to an embodiment of the present invention, the alignment layer is an alignment layer formed from the thermosetting composition with a photo-alignment property or the alignment layer described above, so as to allow the device which is excellent in stability of liquid crystal alignment ability, thermal stability, and solvent resistance, and favorable in optical properties to be obtained.

Advantageous Effects of Disclosure

An embodiment of the present invention produces the effect such as to allow a thermosetting composition with a photo-alignment property, which may form an alignment layer excellent in stability of liquid crystal alignment ability and may be cured by low temperature, to be provided.

DESCRIPTION OF EMBODIMENTS

Figure 1:
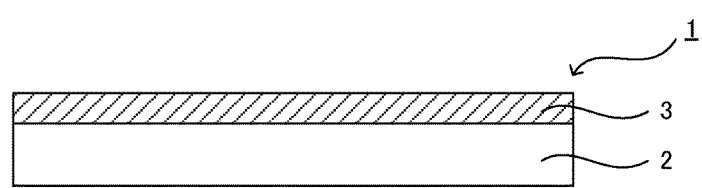
FIG. 1 is a schematic sectional view showing an example of a substrate with an alignment layer of an embodiment of the present invention.

A thermosetting composition with a photo-alignment property, and an alignment layer, a substrate with the alignment layer, a retardation plate and a device using the thermosetting composition of an embodiment of the present invention are hereinafter described in detail.

A. Thermosetting Composition with Photo-Alignment Property

A thermosetting composition with a photo-alignment property of an embodiment of the present invention comprises a copolymer containing a photo-alignment constitutional unit, and a thermal cross-linking constitutional unit in which a thermal cross-linking group is bonded via a straight-chain alkylene group with a carbon number of 4 to 11, or via a polyethylene glycol group with a cycle number of 2 to 5.

In the thermosetting composition with a photo-alignment property of an embodiment of the present invention, the copolymer contains a thermal cross-linking constitutional unit in which a thermal cross-linking group is bonded via predetermined straight-chain alkylene group or polyethylene glycol group so as to exhibit favorable thermal stability and allow low temperature curing. It is conceived to be that the thermal cross-linking group is bonded via the predetermined straight-chain alkylene group or polyethylene glycol group in the thermal cross-linking constitutional unit so that the distance between the thermal cross-linking group and the main skeleton of the copolymer becomes comparatively long, and thus a cross-linking agent easily bonds to the thermal cross-linking group to improve reactivity between the thermal cross-linking constitutional unit and the cross-linking agent. Accordingly, even in the case of forming an alignment layer on a resin substrate with low thermal stability by using the thermosetting composition with a photo-alignment property of an embodiment of the present invention, wrinkles and stretches in the resin substrate caused by heat during formation of the alignment layer may be inhibited, and deviation in alignment direction of the alignment layer caused thereby may be inhibited. Thus, in the case an alignment layer is formed by using the thermosetting composition with a photo-alignment property of an embodiment of the present invention, stability of liquid crystal alignment ability may be improved. Accordingly, in the case of using the alignment layer for various optical elements, deviation in optical axis may be inhibited to obtain favorable optical properties.

In these manners, an embodiment of the present invention allows a thermosetting composition with a photo-alignment property to be capable of being cured by low temperature, and thus curing temperature may be decreased to contribute to save energy.

Also, the thermosetting composition with a photo-alignment property in an embodiment of the present invention includes a thermosetting property to allow the alignment layer excellent in thermal stability and solvent resistance to be obtained.

Each component in the thermosetting composition with a photo-alignment property of an embodiment of the present invention is hereinafter described.

1. Copolymer

A copolymer used for an embodiment of the present invention contains a photo-alignment constitutional unit, and a thermal cross-linking constitutional unit in which a thermal cross-linking group is bonded via the predetermined straight-chain alkylene group or polyethylene glycol group.

Each constitutional unit in the copolymer is hereinafter described.

(1) Thermal Cross-Linking Constitutional Unit

The thermal cross-linking constitutional unit of an embodiment of the present invention is such that thermal cross-linking group is bonded via the predetermined straight-chain alkylene group or polyethylene glycol group, and is a site for bonding to a cross-linking agent by heating.

The strait-chain alkylene group has the carbon number of 4 to 11, and is a group represented by —(CH2)n- (n=4 to 11). The carbon number "n" is preferably 5 to 11. The low carbon number of the straight-chain alkylene group shortens the distance between the thermal cross-linking group and the main skeleton of the copolymer in the thermal cross-linking constitutional unit so that the cross-linking agent bonds to the thermal cross-linking group with difficulty to bring a possibility of deteriorating reactivity between the thermal cross-linking constitutional unit and the cross-linking agent. On the other hand, the high carbon number of the straight-chain alkylene group lengthens the chain length of the linking group in the thermal cross-linking constitutional unit so that the end of the thermal cross-linking group comes out on the surface with difficulty and the cross-linking agent bonds to the thermal cross-linking group with difficulty to bring a possibility of deteriorating reactivity between the thermal cross-linking constitutional unit and the cross-linking agent. Also, the high carbon number of the straight-chain alkylene group decreases the content of the photo-alignment constitutional unit in the copolymer relatively to deteriorate sensitivity and allow favorable liquid crystal alignment ability with difficulty.

Further, the polyethylene glycol group has the cycle number of 2 to 5, and is a group represented by —(C2H4O)m- (m=2 to 5). The cycle number "m" is preferably 3 to 5. Incidentally, the cycle number signifies the average value when the cycle number is spread. The low cycle number of the polyethylene glycol group shortens the distance between the thermal cross-linking group and the main skeleton of the copolymer in the thermal cross-linking constitutional unit so that the cross-linking agent bonds to the thermal cross-linking group with difficulty to bring a possibility of deteriorating reactivity between the thermal cross-linking constitutional unit and the cross-linking agent. On the other hand, the high cycle number of the polyethylene glycol group lengthens the chain length of the linking group in the thermal cross-linking constitutional unit so that the end of the thermal cross-linking group comes out on the surface with difficulty and the cross-linking agent bonds to the thermal cross-linking group with difficulty to bring a possibility of deteriorating reactivity between the thermal cross-linking constitutional unit and the cross-linking agent. Also, the high cycle number of the polyethylene glycol group decreases the content of the photo-alignment constitutional unit in the copolymer relatively to deteriorate sensitivity and allow favorable liquid crystal alignment ability with difficulty.

Examples of the thermal cross-linking group may include a hydroxy group, a carboxy group, a phenolic hydroxy group, a mercapto group, a glycidyl group, and an amide group. Above all, from the viewpoint of reactivity, an aliphatic hydroxy group is preferable, and a primary hydroxy group is more preferable.

Here, in the case the thermal cross-linking group is bonded via the polyethylene glycol group and the thermal cross-linking group is a hydroxy group, the hydroxy group bonded via the predetermined polyethylene glycol group is represented by —(C2H4O)m-H.

Above all, the thermal cross-linking constitutional unit preferably includes —(CH2)n-OH or —(C2H4O)m-H. The value "n" is 4 to 11, and preferably 5 to 11. The value "m" is 2 to 5, and preferably 3 to 5. As described above, the reason therefor is that reactivity of these is high.

Examples of a monomer unit constituting the thermal cross-linking constitutional unit may include acrylate, methacrylate, styrene, acrylamide, methacrylamide, maleimide, vinyl ether, and vinyl ester. Above all, acrylate, methacrylate, and styrene are preferable.

The monomer of acrylate and methacrylate has the advantages that solubility is high, easily obtained as a commercial product, and reactivity during copolymerization is favorable.

Also, in the case of styrene, the thermal cross-linking constitutional unit includes a styrene skeleton so as to allow the copolymer to contain many π-electron systems. Generally, many liquid crystal molecules have an aromatic ring such as a benzene ring and contain π-electron systems similarly. Thus, the alignment layer formed from the thermosetting composition with a photo-alignment property of an embodiment of the present invention may be strong in the interaction with the liquid crystal molecules. In these manners, it is conceived that the liquid crystal molecules may be easily controlled, and thus favorable liquid crystal alignment ability may be obtained. Also, in the liquid crystal alignment layer formed from the thermosetting composition with a photo-alignment property of an embodiment of the present invention, it is conceived that the adhesion properties to a liquid crystal layer disposed on this alignment layer may also be improved by the interaction of π-electron systems.

A constitutional unit represented by the following formula (1) may be exemplified as the thermal cross-linking constitutional unit.

[Chemical Formula 3]

(1)

In the formula (1), Z1 represents a monomer unit and examples thereof may include acrylate, methacrylate, styrene, acrylamide, methacrylamide, maleimide, vinyl ether, and vinyl ester. Above all, as described above, acrylate, methacrylate, and styrene are preferable. Specific examples thereof may include a monomer unit represented by the following formula.

[Chemical Formula 4]

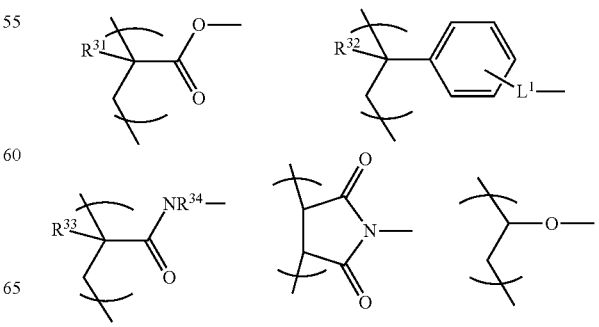

-continued

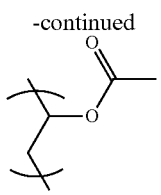

(In the above formula, R31 represents a hydrogen atom, a methyl group, a chlorine atom or a phenyl group, R32 represents a hydrogen atom or a methyl group, L1 represents a single bond, an ether linkage, a thioether linkage, an ester linkage, a thioester linkage, a carbonyl linkage or a thiocarbonyl linkage, R33 represents a hydrogen atom, a methyl group, a chlorine atom or a phenyl group, and R34 represents a hydrogen atom or a lower alkyl group. Incidentally, in the case L1 is the single bond, Y1 is directly bonded to the styrene skeleton.)

In the case the monomer unit is styrene, -L1-Y1 may be bonded to any of an ortho-position, a meta-position, and a para-position, or a plurality thereof. In the case of a plurality, L1 and Y1 may be the same or different mutually. Above all, it is preferable that -L1-Y1 is one and bonded to a para-position.

In the formula (1), Y1 represents —(CH2)n-OH or —(C2H4O)m-H. The value "n" is 4 to 11, and preferably 5 to 11. The value "m" is 2 to 5, and preferably 3 to 5.

Also, the thermal cross-linking constitutional unit may include a cross-linking group. In this case, the thermal cross-linking constitutional unit may also serve as a cross-linking agent. In the case of using the copolymer including such a thermal cross-linking constitutional unit, the thermosetting composition with a photo-alignment property of an embodiment of the present invention may be utilized without adding the cross-linking agent. However, it is preferable that the thermal cross-linking constitutional unit does not include a cross-linking group in view of storage stability.

Examples of the thermal cross-linking constitutional unit including the cross-linking group may include one including a phenolic hydroxy group of which ortho-position is substituted with a hydroxymethyl group or an alkoxymethyl group and a glycidyl group.

The thermal cross-linking constitutional unit of the copolymer may be one kind, or two kinds or more.

A monomer including a thermal cross-linking group for forming the thermal cross-linking constitutional unit may be used for synthesizing the copolymer. The monomer including the thermal cross-linking group may be used singly or in combination of two kinds or more.

The content of the thermal cross-linking constitutional unit in the copolymer may be determined in the range of about 10% by mol to 90% by mol, and is preferably within a range of about 20% by mol to 80% by mol when the whole copolymer is regarded as 100% by mol. The low content of the thermal cross-linking constitutional unit occasionally maintains favorable liquid crystal alignment ability with difficulty by reason of not obtaining a sufficient thermosetting property. Also, the high content of the thermal cross-linking constitutional unit occasionally decreases the content of the photo-alignment constitutional unit relatively to deteriorate sensitivity and allow favorable liquid crystal alignment ability with difficulty.

Incidentally, the content of each constitutional unit in the copolymer may be calculated from an integral value by 1H NMR measurement.

(2) Photo-Alignment Constitutional Unit

The photo-alignment constitutional unit in an embodiment of the present invention is a site for developing anisotropy by causing a photo reaction due to light irradiation. The photo reaction is preferably a photo-dimerization reaction or a photo-isomerization reaction. That is to say, the photo-alignment constitutional unit is preferably a photo-dimerization constitutional unit for developing anisotropy by causing a photo-dimerization reaction due to light irradiation or a photo-isomerization constitutional unit for developing anisotropy by causing a photo-isomerization reaction due to light irradiation.

The photo-alignment constitutional unit includes a photo-alignment group. As described above, the photo-alignment group is a functional group for developing anisotropy by causing a photo reaction due to light irradiation, and preferably a functional group which causes a photo-dimerization reaction or a photo-isomerization reaction.

Examples of the photo-alignment group which causes a photo-dimerization reaction may include a cinnamoyl group, a chalcone group, a coumarin group, an anthracene group, a quinoline group, an azobenzene group, and a stilbene group. A benzene ring in these functional groups may include a substituent. The substituent may be such as not to prevent a photo-dimerization reaction, and examples thereof may include an alkyl group, an aryl group, a cycloalkyl group, an alkoxy group, a hydroxy group, a halogen atom, a trifluoromethyl group, and a cyano group.

The photo-alignment group which causes a photo-isomerization reaction is preferably such as to cause a cis-trans isomerization reaction, and examples thereof may include a cinnamoyl group, a chalcone group, an azobenzene group, and a stilbene group. A benzene ring in these functional groups may include a substituent. The substituent may be such as not to prevent a photo-isomerization reaction, and examples thereof may include an alkoxy group, an alkyl group, a halogen atom, a trifluoromethyl group, and a cyano group.

Above all, the photo-alignment group is preferably a cinnamoyl group. Specifically, the cinnamoyl group is preferably a group represented by the following formulae (2-1) and (2-2).

[Chemical Formula 5]

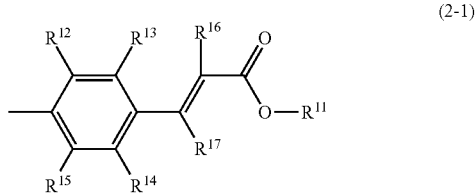

(2-1)

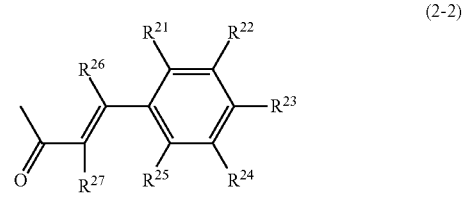

(2-2)

In the formula (2-1), R11 represents a hydrogen atom, an alkyl group with a carbon number of 1 to 18, an aryl group with a carbon number of 1 to 18 or a cycloalkyl group with a carbon number of 1 to 18. However, the alkyl group, the aryl group and the cycloalkyl group may be bonded through an ether linkage, an ester linkage, an amide linkage, and a urea linkage, and may include a substituent. R12 to R15 each independently represent a hydrogen atom, a halogen atom, an alkyl group with a carbon number of 1 to 18, an aryl group with a carbon number of 1 to 18 or a cycloalkyl group with a carbon number of 1 to 18, an alkoxy group with a carbon number of 1 to 18 or a cyano group. However, the alkyl group, the aryl group and the cycloalkyl group may be bonded through an ether linkage, an ester linkage, an amide linkage, and a urea linkage, and may include a substituent. R16 and R17 each independently represent a hydrogen atom, a halogen atom, an alkyl group with a carbon number of 1 to 18, an aryl group with a carbon number of 1 to 18 or an alkoxy group with a carbon number of 1 to 18.

Also, in the formula (2-2), R21 to R25 each independently represent a hydrogen atom, a halogen atom, an alkyl group with a carbon number of 1 to 18, an aryl group with a carbon number of 1 to 18 or a cycloalkyl group with a carbon number of 1 to 18, an alkoxy group with a carbon number of 1 to 18 or a cyano group. However, the alkyl group, the aryl group and the cycloalkyl group may be bonded through an ether linkage, an ester linkage, an amide linkage, and a urea linkage, and may include a substituent. R26 and R27 each independently represent a hydrogen atom, a halogen atom, an alkyl group with a carbon number of 1 to 18, an aryl group with a carbon number of 1 to 18 or an alkoxy group with a carbon number of 1 to 18.

Incidentally, in the case the photo-alignment group is a cinnamoyl group, which is represented by the formula (2-1), a benzene ring of a styrene skeleton may be a benzene ring of the cinnamoyl group.

Also, the cinnamoyl group represented by the formula (2-1) is more preferably the group represented by the following formula (2-3).

[Chemical Formula 6]

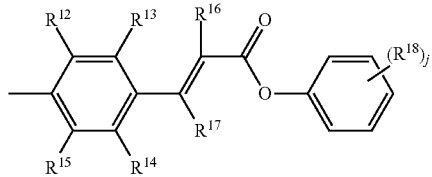

(2-3)

In the formula (2-3), R12 to R15 are the same as in the formula (2-1). R18 represents a hydrogen atom, an alkoxy group with a carbon number of 1 to 18, a cyano group, an alkyl group with a carbon number of 1 to 18, a phenyl group, a biphenyl group or a cycloalkyl group. However, the alkyl group, the phenyl group, the biphenyl group and the cyclohexyl group may be bonded through an ether linkage, an ester linkage, an amide linkage, and a urea linkage. The value "j" represents 1 to 5, and R18 may be bonded to any of an ortho-position, a meta-position, and a para-position. In the case "j" is 2 to 5, R18 may be the same or different mutually. Above all, it is preferable that "j" is 1, and R18 is bonded to a para-position.

In the case the photo-alignment constitutional unit is a constitutional unit represented by the formulae (2-3) and (2-2), an aromatic ring is disposed in the vicinity of the end of the photo-alignment constitutional unit to contain many π-electrons. Thus, an affinity for a liquid crystal layer disposed on the alignment layer is conceived to become so higher as to improve adhesion properties to the liquid crystal layer.

Examples of a monomer unit constituting the photo-alignment constitutional unit may include acrylate, methacrylate, styrene, acrylamide, methacrylamide, maleimide, vinyl ether, and vinyl ester. Above all, similarly to the thermal cross-linking constitutional unit, acrylate, methacrylate, and styrene are preferable.

A constitutional unit represented by the following formula (3) may be exemplified as the photo-alignment constitutional unit.

[Chemical Formula 7]

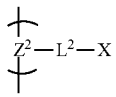

(3)

In the formula (3), Z2 represents a monomer unit, and examples thereof may include acrylate, methacrylate, styrene, acrylamide, methacrylamide, maleimide, vinyl ether, and vinyl ester. Above all, as described above, acrylate, methacrylate, and styrene are preferable. Specific examples thereof may include a monomer unit represented by the following formula.

[Chemical Formula 8]

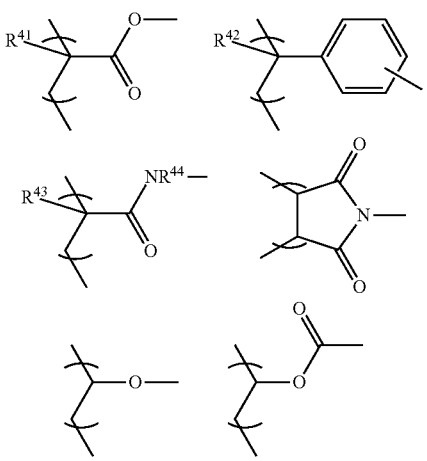

(In the formula, R41 represents a hydrogen atom, a methyl group, a chlorine atom or a phenyl group, R42 represents a hydrogen atom or a methyl group, R43 represents a hydrogen atom, a methyl group, a chlorine atom or a phenyl group, and R44 represents a hydrogen atom or a lower alkyl group.)

In the case the monomer unit is styrene, -L2-X may be bonded to any of an ortho-position, a meta-position, and a para-position, or a plurality thereof. In the case of a plurality, L2 and X may be the same or different mutually. Above all, it is preferable that -L2-X is one and bonded to a para-position.

In the formula (3), X represents the photo-alignment group, and examples thereof may include a cinnamoyl group, a chalcone group, a coumarin group, an anthracene group, a quinoline group, an azobenzene group, or a stilbene group. A benzene ring in these functional groups may include a substituent. The substituent may be such as not to prevent a photo-dimerization reaction and a photo-isomerization reaction, and examples thereof may include an alkyl group, an aryl group, a cycloalkyl group, an alkoxy group, a hydroxy group, a halogen atom, a trifluoromethyl group, and a cyano group.

Above all, the photo-alignment group is preferably a cinnamoyl group. Specifically, the groups represented by the formulae (2-1) and (2-2) are preferable.

In the formula (3), L2 is a single bond or a divalent linking group. Incidentally, in the case L2 is the single bond, the photo-alignment group X is directly bonded to the monomer unit Z2. Examples of the divalent linking group may include an ether linkage, a thioether linkage, an ester linkage, a thioester linkage, a carbonyl linkage, a thiocarbonyl linkage, an alkylene group, an arylene group, a cycloalkylene group, and combinations of these.

The photo-alignment constitutional unit of the copolymer may be one kind, or two kinds or more.

A monomer including the photo-alignment group for forming the photo-alignment constitutional unit may be used for synthesizing the copolymer. The monomer including the photo-alignment group may be used singly or in combination of two kinds or more.

The content of the photo-alignment constitutional unit in the copolymer may be determined within a range of about 10% by mol to 90% by mol, preferably within a range of about 20% by mol to 80% by mol when the whole copolymer is regarded as 100% by mol. The low content of the photo-alignment constitutional unit occasionally deteriorates sensitivity to allow favorable liquid crystal alignment ability with difficulty. Also, the high content of the photo-alignment constitutional unit occasionally decreases the content of the thermal cross-linking constitutional unit relatively to maintain favorable liquid crystal alignment ability with difficulty by reason of not obtaining a sufficient thermosetting property.

(3) Another Constitutional Unit

In an embodiment of the present invention, the copolymer may include a constitutional unit including neither photo-alignment groups nor thermal cross-linking groups other than the photo-alignment constitutional unit and the thermal cross-linking constitutional unit. The inclusion of another constitutional unit in the copolymer allows abilities such as solvent solubility, thermal stability, and reactivity to be improved.

Examples of a monomer unit constituting the constitutional unit not including photo-alignment groups or thermal cross-linking groups may include acrylate, methacrylate, maleimide, acrylamide, methacrylamide, acrylonitrile, maleic anhydride, styrene, and vinyl. Above all, similarly to the thermal cross-linking constitutional unit, acrylate, methacrylate, and styrene are preferable.

Examples of a monomer for forming such a constitutional unit not including photo-alignment groups or thermal cross-linking groups may include an acrylate compound, a methacrylate compound, a maleimide compound, an acrylamide compound, acrylonitrile, maleic anhydride, a styrene compound, and a vinyl compound.

Examples of the acrylate compound may include methyl acrylate, ethyl acrylate, isopropyl acrylate, benzyl acrylate, naphtyl acrylate, anthryl acrylate, anthrylmethyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, 2-aminoethyl acrylate, tetrahydrofurfuryl acrylate, 3-methoxybutyl acrylate, 2-methyl-2-adamantylacrylate, 2-propyl-2-adamantylacrylate, 8-methyl-8-tricyclodecyl acrylate, and 8-ethyl-8-tricyclodecyl acrylate.

Examples of the methacrylate compound may include methyl methacrylate, ethyl methacrylate, isopropyl methacrylate, benzyl methacrylate, naphtyl methacrylate, anthryl methacrylate, anthrylmethylmethacrylate, phenyl methacrylate, glycidyl methacrylate, 2,2,2-trifluoroethyl methacrylate, tert-butyl methacrylate, cyclohexyl methacrylate, isobornyl methacrylate, 2-methoxyethylmethacrylate, methoxytriethylene glycolmethacrylate, 2-ethoxyethylmethacrylate, 2-aminomethyl methacrylate, tetrahydrofurfurylmethacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate and 8-ethyl-8-tricyclodecyl methacrylate.

Examples of the vinyl compound may include methyl vinyl ether, benzyl vinyl ether, vinylnaphthalene, vinylcarbazole, allylglycidyl ether, 3-ethenyl-7-oxabicyclo[4.1.0]heptane, 1,2-epoxy-5-hexene and 1,7-octadiene monoepoxide.

Examples of the styrene compound may include styrene, para-methyl styrene, α-methyl styrene, chlorostyrene, bromostyrene, para-trifluoromethyl styrene, para-trifluoromethyl-α-methyl styrene, 4(4-trifluoromethylbenzoyloxy)styrene, para-cetyloxystyrene, and para-palmitoyloxystyrene.

Examples of the maleimide compound may include maleimide, N-methylmaleimide, N-phenylmaleimide and N-cyclohexylmaleimide.

The constitutional unit not including photo-alignment groups or thermal cross-linking groups in the copolymer may be one kind, or two kinds or more.

The content of the constitutional unit in the copolymer is preferably within a range of about 0% by mol to 50% by mol, and more preferably within a range of about 0% by mol to 30% by mol when the whole copolymer is regarded as 100% by mol. The high content of the constitutional unit occasionally decreases the content of the photo-alignment constitutional unit and the thermal cross-linking constitutional unit relatively, to deteriorate sensitivity, allow favorable liquid crystal alignment ability with difficulty, allow no sufficient thermosetting property and maintain favorable liquid crystal alignment ability with difficulty.

(4) Copolymer

The number-average molecular weight of the copolymer is not particularly limited and may be determined at approximately 3,000 to 200,000, and preferably within a range of about 4,000 to 100,000. Too large number-average molecular weight occasionally deteriorates handleability by reason of decreasing solubility in solvent and increasing viscosity to form a uniform film with difficulty. Also, too small number-average molecular weight occasionally deteriorates solvent resistance and thermal stability by reason of curing shortage during thermal curing.

Incidentally, the number-average molecular weight may be measured by a gel permeation chromatography (GPC) method.

Examples of a synthesis method for the copolymer may include a method for copolymerizing a monomer including the photo-alignment group and a monomer including the thermal cross-linking group.

The synthesis method for the copolymer is not particularly limited, but the copolymer may be obtained by polymerization in a solvent in which a monomer including the photo-alignment group, a monomer including the thermal cross-linking group, and a polymerization initiator coexist. On that occasion, the solvent to be used is not particularly limited if it dissolves a monomer including the photo-alignment group, a monomer including the thermal cross-linking group and a polymerization initiator. Specifically, the solvent may be the same as the after-mentioned solvent used for the thermosetting composition with a photo-alignment property. Also, the temperature during the polymerization reaction may be determined at approximately 50° C. to 120° C. The copolymer obtained by the method is ordinarily in a state of a solution dissolved in the solvent.

The copolymer obtained by the method may be used directly or used after being purified by the method described below.

That is to say, the solution of the copolymer obtained by the method is projected into diethyl ether, methanol or water while stirred, and reprecipitated, and then the produced precipitate is filtered, washed and thereafter subjected to drying at room temperature or drying by heating under normal pressure or reduced pressure to obtain powder of the copolymer. The polymerization initiator and unreacted monomer coexisting with the copolymer may be removed by this process to consequently allow purified powder of the copolymer to be obtained. In the case of being incapable of sufficient purification in one process, the obtained powder may be redissolved in the solvent to repeat the process.

The copolymer may be used in the form of the solution during the synthesis thereof, in the form of the powder, or in the form of the solution in which the purified powder is redissolved in the after-mentioned solvent.

Also, the copolymer may be one kind or a mixture of plural kinds of copolymers.

2. Cross-Linking Agent

The thermosetting composition with a photo-alignment property of an embodiment of the present invention preferably contains a cross-linking agent. The cross-linking agent bonds to the thermal cross-linking constitutional unit of the copolymer, and allows thermal stability and solvent resistance to be improved.

Examples of the cross-linking agent may include an epoxy compound, a methylol compound, and an isocyanato compound. Above all, a methylol compound is preferable.

Examples of the methylol compound may include alkoxymethylatedglycoluril, alkoxymethylatedbenzoguanamine, and alkoxymethylated melamine.

Examples of the alkoxymethylated glycoluril may include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone and 1,3-bis(methoxymethyl)-4,5-dimethoxy-2-imidazolinone. Examples of a commercial product thereof may include a compound such as a glycoluril compound (trade name CYMEL 1170 and POWDERLINK 1174), methylated urea resin (trade name UFR65) and butylated urea resin (trade name UFR300, U-VAN10S60, U-VAN10R and U-VAN11HV) manufactured by Mitsui Cytec Ltd., urea/formaldehyde resin (high condensation type, trade name BECKAMINEJ-300S, BECKAMINE P-955, andBECKAMINEN) manufactured by DIC Corporation, and a glycoluril compound (trade name NIKALAC MX-270), and an imidazolidine compound (trade name NIKALAC MX-280) manufactured by SANWA CHEMICAL CO., LTD.

Examples of the alkoxymethylated benzoguanamine may include tetramethoxymethylbenzoguanamine. Examples of a commercial product thereof may include products (trade name CYMEL 1123) manufactured by Mitsui Cytec Ltd., and (trade name NIKALAC BX-4000, NIKALAC BX-37, NIKALAC BL-60, and NIKALAC BX-55H) manufactured by SANWA CHEMICAL CO., LTD.

Examples of the alkoxymethylated melamine may include hexamethoxymethylmelamine. Examples of a commercial product thereof may include methoxymethyl type melamine compounds (trade name CYMEL 300, CYMEL 301, CYMEL 303, CYMEL 350, and CYMEL 3745), and butoxymethyl type melamine compounds (trade name MYCOAT 506, MYCOAT 508, and CYMEL 1156) manufactured by Mitsui Cytec Ltd., and methoxymethyl type melamine compounds (trade name NIKALAC MW-30, MW-22, MW-11, MS-001, MX-002, MX-730, MX-750, MX-035, MW-390, MW-100LM, and MX-750LM), and butoxymethyl type melamine compounds (trade name NIKALAC MX-45, MX-410, and MX-302) manufactured by SANWA CHEMICAL CO., LTD.

Also, a cross-linking agent containing plural benzene rings in a molecule may be utilized. Examples of the cross-linking agent containing plural benzene rings in a molecule may include a phenol derivative with a molecular weight of 1200 or less, including two or more of a hydroxymethyl group or an alkoxymethyl group in total, and a melamine-formaldehyde derivative and an alkoxymethylglycoluril derivative including at least two free N-alkoxymethyl groups. The phenol derivative including a hydroxymethyl group may be obtained by reacting a phenol compound not including the corresponding hydroxymethyl group with formaldehyde under a base catalyst.

Also, the cross-linking agent may be a compound obtained by condensing such melamine compound, urea compound, glycoluril compound, and benzoguanamine compound in which a hydrogen atom of an amino group is substituted with a methylol group or an alkoxymethyl group. Examples thereof may include a high-molecular-weight compound produced from the melamine compound and the benzoguanamine compound described in U.S. Pat. No. 6,323,310. Examples of a commercial product of the melamine compound may include trade name CYMEL 303 (manufactured by Mitsui Cytec Ltd.). Examples of a commercial product of the benzoguanamine compound may include trade name CYMEL 1123 (manufactured by Mitsui Cytec Ltd.).

In addition, a polymer produced by using an acrylamide compound or a methacrylamide compound substituted with a hydroxymethyl group or an alkoxymethyl group, such as N-hydroxymethylacrylamide, N-methoxymethylmethacrylamide, N-ethoxymethylacrylamide, and N-butoxymethylmethacrylamide, may be used as the cross-linking agent.

Examples of such a polymer may include poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. The weight-average molecular weight of such a polymer is within a range of about 1,000 to 500,000, preferably within a range of about 2,000 to 200,000, more preferably within a range of about 3,000 to 150,000, and further more preferably within a range of about 3,000 to 50,000.

These cross-linking agents may be used singly or in combination of two kinds or more.

The content of the cross-linking agent in the thermosetting composition with a photo-alignment property of an embodiment of the present invention is preferably within a range of about 1 part by mass to 40 parts by mass, and more preferably within a range of about 5 parts by mass to 30 parts by mass with respect to 100 parts by mass of the copolymer. Too small content brings a possibility of deteriorating thermal stability and solvent resistance of a cured film formed from the thermosetting composition with a photo-alignment property to deteriorate liquid crystal alignment ability. Also, too large content occasionally deteriorates liquid crystal alignment ability and storage stability.

3. Acid or Acid Generator

The thermosetting composition with a photo-alignment property of an embodiment of the present invention may contain an acid or an acid generator. An acid or an acid generator allows a thermosetting reaction of the thermosetting composition with a photo-alignment property of an embodiment of the present invention to be promoted.

The acid or the acid generator is not particularly limited if it is a sulfonic group-containing compound, hydrochloric acid or a salt thereof, and a compound which is thermally decomposed during pre-bake and post-bake to generate an acid, namely, a compound which is thermally decomposed at a temperature of 80° C. to 250° C. to generate an acid. Examples of such a compound may include hydrochloric acid, and sulfonic acid or hydrates and salts thereof such as methansulfonic acid, ethansulfonic acid, propansulfonic acid, butansulfonic acid, pentansulfonic acid, octansulfonic acid, benzenesulfonic acid, para-toluenesulfonic acid, camphasulfonic acid, trifluoromethansulfonic acid, para-phenolsulfonic acid, 2-naphthalenesulfonic acid, mesitylenesulfonic acid, para-xylene-2-sulfonic acid, meta-xylene-2-sulfonic acid, 4-ethylbenezenesulfonic acid, 1H, 1H, 2H, 2H-perfluorooctansulfonic acid, perfluoro(2-ethoxyethane) sulfonic acid, pentafluoroethanesulfonic acid, nonafluorobutane-1-sulfonic acid, and dodecylbenzenesulfonic acid. Examples of a compound which generates an acid by heat may include bis(tosyloxy) ethane, bis(tosyloxy)propane, bis (tosyloxy)butane, para-nitrobenzyl tosylate, ortho-nitrobenzyl tosylate, 1,2,3-phenylenetris(methylsulfonate), para-toluenesulfonic acid pyridinium salt, para-toluenesulfonic acid morphonium salt, para-toluenesulfonic acid ethyl ester, para-toluenesulfonic acid propyl ester, para-toluenesulfonic acid butyl ester, para-toluenesulfonic acid isobutyl ester, para-toluenesulfonic acid methyl ester, para-toluenesulfonic acid phenethyl ester, cyanomethyl para-toluenesulfonate, 2,2,2-trifluoroethyl para-toluenesulfonate, 2-hydroxybutyl para-tosylate, and N-ethyl-4-toluenesulfonamide. Also, a compound described in WO 2010/150748 may be used as the compound which generates an acid by heat.

The content of the acid or the acid generator in the thermosetting composition with a photo-alignment property of an embodiment of the present invention is preferably within a range of about 0.01 part by mass to 20 parts by mass, more preferably within a range of about 0.05 part by mass to 10 parts by mass, and further more preferably within a range of about 0.1 part by mass to 5 parts by mass with respect to 100 parts by mass of the copolymer. The content of the acid or the acid generator within the range allows sufficient thermosetting property and solvent resistance, and high sensitivity to light irradiation. On the other hand, too large content occasionally deteriorates storage stability of the thermosetting composition with a photo-alignment property.

4. Sensitizer

The thermosetting composition with a photo-alignment property of an embodiment of the present invention may contain a sensitizer. A sensitizer allows a photoreaction such as a photo-dimerization reaction and a photo-isomerization reaction to be promoted.

Examples of the sensitizer may include benzophenone, anthracene, anthraquinone, thioxanthone, and derivatives of these, and a nitrophenyl compound. Among these, benzophenone derivatives and a nitrophenyl compound are preferable. Examples of the preferable compound may include N,N-diethylaminobenzophenone, 2-nitrofluorene, 2-nitrofluorenone, 5-nitroacenaphthene, and 4-nitrobiphenyl. In particular, N,N-diethylaminobenzophenone, which is a derivative for benzophenone, is preferable. The sensitizer may be used singly or in combination of two kinds or more of compounds together.

The content of the sensitizer in the thermosetting composition with a photo-alignment property of an embodiment of the present invention is preferably within a range of about 0.1 part by mass to 20 parts by mass, and more preferably within a range of about 0.2 part by mass to 10 parts by mass with respect to 100 parts by mass of the copolymer. Too small content occasionally does not allow a sufficient effect of the sensitizer, and too large content occasionally brings the deterioration of transmittance and roughness of a coating film.

5. Solvent

The thermosetting composition with a photo-alignment property of an embodiment of the present invention is mainly used in a solution state of being dissolved in a solvent.

The solvent is not particularly limited if it may dissolve each of the components, and examples thereof may include ethylene glycolmonomethyl ether, ethylene glycolmonoethyl ether, methyl Cellosolve acetate, ethyl Cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, ethylene glycol dimethyl ether, propylene glycol dimethyl ether, toluene, xylene, methyl ethyl ketone, cyclopentanone, cyclohexanone, 2-butanone, 3-methyl-2-pentanone,2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoic acid, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone. The solvent may be used in one kind singly or in combination of two kinds or more.

Above all, propylene glycol monomethyl ether, propylene glycolmonomethyl ether acetate, ethylene glycol dimethyl ether, propylene glycol dimethyl ether, methyl ethyl ketone, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate are preferable by reason of favorable film formation and high safety.

6. Addition Agent

The thermosetting composition with a photo-alignment property of an embodiment of the present invention may contain a silane coupling agent, a surface-active agent, a rheology adjustor, a pigment, dyestuffs, a storage stabilizer, an antifoaming agent and an antioxidant as required as long as the effect of an embodiment of the present invention is not deteriorated. Also, a liquid crystalline monomer may be contained for improving liquid crystal alignment ability.

7. Thermosetting Composition with Photo-Alignment Property

The thermosetting composition with a photo-alignment property of an embodiment of the present invention is ordinarily used as a solution in which each of the components is dissolved in a solvent. The ratio of solid content in the thermosetting composition with a photo-alignment property of an embodiment of the present invention is not particularly limited if each of the components is uniformly dissolved in a solvent, and is within a range of about 0.1% by mass to 80% by mass, preferably within a range of about 0.5% by mass to 60% by mass, and more preferably within a range of about 0.5% by mass to 40% by mass. Too small ratio of solid content occasionally allows liquid crystal alignment ability and thermosetting property with difficulty. Also, too large ratio of solid content increases the viscosity of the thermosetting composition with a photo-alignment property to form a uniform film with difficulty.

Incidentally, the solid content signifies such that the solvent is removed from all components of the thermosetting composition with a photo-alignment property.

A method for preparing the thermosetting composition with a photo-alignment property of an embodiment of the present invention is not particularly limited but is preferably a method for mixing the copolymer, the cross-linking agent, the sensitizer and other addition agents to thereafter add the acid or the acid generator for the reason that storage stability is improved. Incidentally, in the case of adding the acid or the acid generator first, the compound which is thermally decomposed during drying and thermal curing of a coating film to generate an acid is preferably used as the acid or the acid generator.

A solution of the copolymer obtained by a polymerization reaction in the solvent may be used directly in the preparation of the thermosetting composition with a photo-alignment property of an embodiment of the present invention. In this case, as described above, the cross-linking agent, the sensitizer and other addition agents are projected into the solution of the copolymer to obtain the uniform solution, to which the acid or the acid generator is thereafter added. On this occasion, a solvent may be further added for the purpose of concentration adjustment. Then, the solvent used in the production process of the copolymer and the solvent used for concentration adjustment of the thermosetting composition with a photo-alignment property may be the same or different.

Also, the adjusted solution of the thermosetting composition with a photo-alignment property is preferably used after being filtered by using a filter with a pore diameter of approximately 0.2 μm.

8. Uses

Examples of the uses of the thermosetting composition with a photo-alignment property of an embodiment of the present invention may include an alignment layer of various optical elements such as a retardation plate, and an alignment layer of a liquid crystal display element. Also, the thermosetting composition with a photo-alignment property of an embodiment of the present invention may be used for an insulating film and a protective film in various devices such as a liquid crystal display element, an organic EL element, TFT, and a color filter; examples thereof may include an insulating film of an organic EL element, an interlayer insulating film of TFT, and an overcoat layer of a color filter.

B. Alignment Layer

An alignment layer of an embodiment of the present invention comprises a copolymer including a photo-alignment constitutional unit, a thermal cross-linking constitutional unit in which a thermal cross-linking group is bonded via a straight-chain alkylene group with a carbon number of 4 to 11 or via a polyethylene glycol group with a cycle number of 2 to 5, and a cross-linking structure, and the alignment layer comprises a photo-dimerization structure or a photo-isomerization structure of a photo-alignment group in the photo-alignment constitutional unit.

Here, the cross-linking structure signifies a three-dimensional network structure. The after-mentioned structure such that photo-alignment groups are cross-linked by a photo-dimerization reaction is not included in the cross-linking structure.

According to an embodiment of the present invention, the alignment layer includes the predetermined copolymer so that stable liquid crystal alignment ability, favorable thermal stability and solvent resistant may be obtained.

The copolymer includes the photo-alignment constitutional unit, the thermal cross-linking constitutional unit in which a thermal cross-linking group is bonded via the predetermine alkylene group or polyethylene glycol group, and a cross-linking structure, that may be formed by heat-curing the copolymer containing the photo-alignment constitutional unit and the thermal cross-linking constitutional unit in which a thermal cross-linking group is bonded via the predetermined alkylene group or polyethylene glycol group, described in the "A. Thermosetting composition with photo-alignment property". The cross-linking structure is a three-dimensional network structure and a structure such that a thermal cross-linking group of a thermal cross-linking constitutional unit is cross-linked. The thermal cross-linking group of a thermal cross-linking constitutional unit ordinarily bonds to the cross-linking agent or the cross-linking group of the thermal cross-linking constitutional unit. Accordingly, the cross-linking structure is a structure such that the thermal cross-linking group and the cross-linking agent or the cross-linking group of the thermal cross-linking constitutional unit are cross-linked by heating.

Incidentally, each constitutional unit of the copolymer is described in detail in the "A. Thermosetting composition with photo-alignment property"; therefore, the description herein is omitted.

It may be confirmed by taking and analyzing a material from the alignment layer that the alignment layer contains the copolymer. A method of NMR, IR, GC-MS, XPS, TOF-SIMS, and a combination of these may be applied to an analytical method.

The alignment layer of an embodiment of the present invention comprises a photo-dimerization structure or a photo-isomerization structure of a photo-alignment group in the photo-alignment constitutional unit. The photo-dimerization structure is a structure such that the photo-alignment groups are cross-linked by a photo-dimerization reaction. Also, the photo-isomerization structure is a structure such that the photo-alignment group is isomerized by a photo-isomerization reaction. For example, in the case of a cis-trans isomerization reaction, the photo-isomerization structure may be any of a structure such that a cis body changes to a trans body and a structure such that a trans body changes to a cis body.

Incidentally, it may be analyzed by NMR or IR that the alignment layer includes the photo-dimerization structure or photo-isomerization structure.

Also, the alignment layer may contain a cross-linking agent, an acid or an acid generator, a sensitizer, and another addition agent. Incidentally, these addition agents are the same as those described in the "A. Thermosetting composition with photo-alignment property".

Other features such as a formation method and a film thickness of the alignment layer are the same as those of the alignment layer in the after-mentioned substrate with the alignment layer; therefore, the description herein is omitted.

C. Substrate with Alignment Layer

A substrate with an alignment layer of an embodiment of the present invention comprises a substrate, and an alignment layer formed from the thermosetting composition with a photo-alignment property or the alignment layer described above, disposed on the substrate.

FIG. 1 is a schematic sectional view showing an example of the substrate with an alignment layer of an embodiment of the present invention. In a substrate with an alignment layer 1 exemplified in FIG. 1, an alignment layer 3 is disposed on a substrate 2, and the alignment layer 3 is such as to be formed from the thermosetting composition with a photo-alignment property described above or is the alignment layer described above.

According to an embodiment of the present invention, the alignment layer is such as to be formed from the thermosetting composition with a photo-alignment property or the alignment layer described above, so as to improve stability of liquid crystal alignment ability, thermal stability, and solvent resistance.

Each constitution in the substrate with an alignment layer of an embodiment of the present invention is hereinafter described.

1. Alignment Layer

The alignment layer in an embodiment of the present invention is such as to be formed from the thermosetting composition with a photo-alignment property or the alignment layer described above, and has the function of aligning liquid crystal molecules.

Here, the alignment layer formed from the thermosetting composition with a photo-alignment property signifies an alignment layer obtained in such a manner that a film containing the thermosetting composition with a photo-alignment property is heat-cured and photo-aligned.

That is to say, in the formation of the alignment layer, first, the thermosetting composition with a photo-alignment property is applied on a substrate, dried and heated to form a cured film. Next, the cured film is irradiated with polarized ultraviolet rays to form the alignment layer.

An application method of the thermosetting composition with a photo-alignment property is not particularly limited if it is a method such as to allow a uniform film on the substrate to be formed, and examples thereof may include a spin coat method, a roll coat method, a rod bar coat method, a spray coat method, an air-knife coat method, a slot die coat method, a wire bar coat method, a flow coat method and an ink jet method.

Tools such as a hot plate and an oven may be used for drying a coating film. The temperature may be determined at approximately 30° C. to 160° C., preferably within a range of about 50° C. to 140° C., and more preferably the later described upper limit of favorable heating temperature or less. The time may be determined at approximately 20 seconds to 60 minutes, and preferably within a range of about 30 seconds to 10 minutes.

Tools such as a hot plate and an oven may be also used for heat-curing the coating film. The temperature may be determined at approximately 30° C. to 250° C., preferably within a range of about 50° C. to 120° C., and more preferably within a range of about 50° C. to 100° C. The time may be determined at approximately 20 seconds to 60 minutes.

Also, drying and heat-curing of the coating film may be performed simultaneously or separately.

The film thickness of the cured film obtained by heat-curing the thermosetting composition with a photo-alignment property is properly selected in accordance with uses, and may be determined at approximately 50 nm to 30 μm. Incidentally, too thin film thickness of the cured film occasionally does not allow sufficient liquid crystal alignment ability.

The obtained cured film may be irradiated with polarized ultraviolet rays and thereby photo-dimerized or photo-isomerized to develop anisotropy. The wavelength of the polarized ultraviolet rays is ordinarily within a range of about 150 nm to 450 nm. Also, the irradiation direction of the polarized ultraviolet rays may be a vertical or an oblique direction to a substrate plane.

Incidentally, it may be confirmed by taking and analyzing a material from the alignment layer that the alignment layer is formed from the thermosetting composition with a photo-alignment property. A method of NMR, IR, GC-MS, XPS, TOF-SIMS, and a combination of these may be applied to an analytical method.

2. Substrate

A substrate used for an embodiment of the present invention supports the alignment layer.

The substrate is not particularly limited and is properly selected in accordance with uses. Examples of a material for the substrate may include glass and quartz, resins such as polyethylene terephthalate, polycarbonate, triacetylcellulose, polyester, polysulfone, polyether sulfone, cyclopolyolefin, and acryl, metals such as aluminum, and ceramics such as silicon and silicon nitride. Above all, in an embodiment of the present invention, the substrate is preferably a resin substrate for the reason that the thermosetting composition with a photo-alignment property may be cured by low temperature.

Also, the substrate may be subjected to surface treatment. The substrate may have flexibility or not, which is properly selected in accordance with uses.

3. Conductive Layer

In an embodiment of the present invention, a conductive layer may be formed between the substrate and the alignment layer. The conductive layer functions as an electrode of various kinds of devices, for example. Examples of a material for the conductive layer may include transparent conductive materials such as ITO and IZO, and metallic materials such as aluminum, molybdenum and chromium.

4. Uses

Examples of the uses of the substrate with an alignment layer of an embodiment of the present invention may include various optical elements such as a retardation plate, a liquid crystal display element, and a light emitting element.

D. Retardation Plate

A retardation plate of an embodiment of the present invention comprises the substrate with an alignment layer described above and a retardation layer disposed on the alignment layer of the substrate with the alignment layer.

Figure 2:
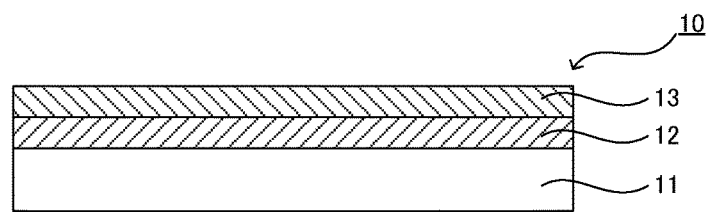
FIG. 2 is a schematic sectional view showing an example of a retardation plate in an embodiment of the present invention.

FIG. 2 is a schematic sectional view showing an example of the retardation plate in an embodiment of the present invention. In a retardation plate 10 exemplified in FIG. 2, an alignment layer 12 is disposed on a substrate 11 and a retardation layer 13 is disposed on the alignment layer 12. The alignment layer 12 is such as to be formed from the thermosetting composition with a photo-alignment property or the alignment layer described above, and the retardation layer 13 corresponds to a liquid crystal layer.

The retardation layer may be obtained in such a manner that a liquid crystal composition is applied on the alignment layer and heated up to phase transition temperature of the liquid crystal composition, and liquid crystal molecules are aligned by the alignment layer and cured.

A liquid crystal composition generally used for a retardation layer may be used as the liquid crystal composition used for the retardation layer. Examples of the liquid crystal composition may include a liquid crystal composition including alignment properties such as horizontal alignment, cholesteric alignment, vertical alignment, and hybrid alignment, and the liquid crystal composition is properly selected in accordance with a combination with the alignment layer and a desired retardation. Also, the film thickness and formation method of the retardation layer may be the same as those of a general retardation layer.

The retardation plate may have flexibility or not.

E. Device

A device of an embodiment of the present invention comprises an alignment layer formed from the thermosetting composition with a photo-alignment property or the alignment layer described above.

The device is not particularly limited if it is such as to include the alignment layer, and examples thereof may include various optical elements such as a retardation plate, a liquid crystal display element, and a light emitting element.

The device is hereinafter described while divided into a retardation plate and a liquid crystal display element.

1. Retardation Plate

A retardation plate in an embodiment of the present invention comprises a substrate, an alignment layer formed from the thermosetting composition with a photo-alignment property or the alignment layer described above, disposed on the substrate, and a retardation layer disposed on the alignment layer.

Incidentally, the retardation layer is described in the "D. Retardation plate"; therefore, the description herein is omitted.

A conductive layer may be formed between the substrate and the alignment layer. Incidentally, the substrate, the alignment layer and the conductive layer are the same as the substrate, the alignment layer and the conductive layer in the "C. Substrate with alignment layer"; therefore, the description herein is omitted.

The retardation plate may have flexibility or not.

2. Liquid Crystal Display Element

A liquid crystal display element in an embodiment of the present invention has two embodiments. The liquid crystal display element is hereinafter described while divided into each of the embodiments.

(1) First Embodiment

The first embodiment of the liquid crystal display element in an embodiment of the present invention includes a first substrate with an alignment layer in which a first alignment layer is disposed on a first substrate, a second substrate with an alignment layer in which a second alignment layer is disposed on a second substrate, and a liquid crystal layer disposed between the first substrate with an alignment layer and the second substrate with an alignment layer, and the first alignment layer and the second alignment layer are such as to be formed from the thermosetting composition with a photo-alignment property, or the alignment layer described above.

Figure 3:
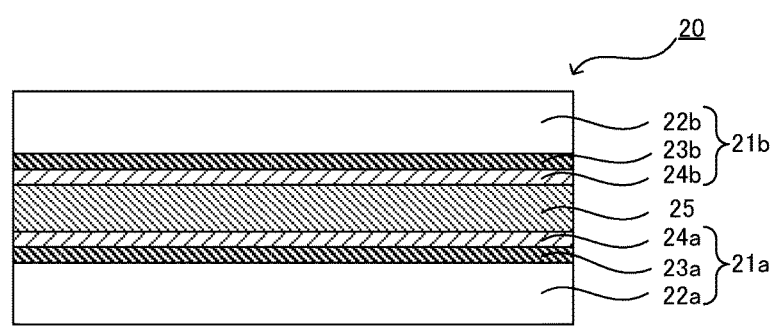
FIG. 3 is a schematic sectional view showing an example of a liquid crystal display element in an embodiment of the present invention.

FIG. 3 is a schematic sectional view showing an example of the liquid crystal display element in an embodiment of the present invention. A liquid crystal display element 20 exemplified in FIG. 3 comprises a first substrate with an alignment layer 21a, a second substrate with an alignment layer 21b, and a liquid crystal layer 25 disposed between the first substrate with an alignment layer 21a and the second substrate with an alignment layer 21b. In the first substrate with an alignment layer 21a, a first electrode 23a and a first alignment layer 24a are sequentially laminated on a first substrate 22a; in the second substrate with an alignment layer 21b, a second electrode 23b and a second alignment layer 24b are sequentially laminated on a second substrate 22b. The first alignment layer 24a and the second alignment layer 24b are such as to be formed from the thermosetting composition with a photo-alignment property or the alignment layer described above.

A liquid crystal composition generally used for a liquid crystal layer may be used as the liquid crystal composition used for the liquid crystal layer. For example, nematic liquid crystal and smectic liquid crystal may be used. Also, the film thickness and formation method of the liquid crystal layer may be the same as those of a general liquid crystal layer.

Also, a conductive layer is ordinarily formed as an electrode, at least either between the first substrate and the alignment layer or between the second substrate and the alignment layer.

Incidentally, the first substrate, the second substrate, the alignment layer, and the conductive layer are the same as the substrate, the alignment layer, and the conductive layer in the "C. Substrate with alignment layer"; therefore, the description herein is omitted.

Also, other constitutions of the liquid crystal display element may be the same as the constitutions of a general liquid crystal display element.

(2) Second Embodiment

The second embodiment of the liquid crystal display element in an embodiment of the present invention comprises the retardation plate.

The constitutions of the liquid crystal display element may be the same as the constitutions of a general liquid crystal display element. For example, the retardation plate may be disposed outside the substrate constituting the liquid crystal display element, or the substrate constituting the liquid crystal display element may also serve as the substrate constituting the retardation plate, and the alignment layer and the retardation layer may be disposed inside the substrate.

The present disclosure is not limited to the embodiments. The embodiments are exemplification, and any is included in the technical scope of the present disclosure if it has substantially the same constitution as the technical idea described in the claim of the present disclosure and offers similar operation and effect thereto.

EXAMPLES

Embodiments of the present invention are described in further detail with reference to examples and comparative examples hereinafter.

Synthesis Example 1

Synthesis of Photo-Alignment Monomer A1

A photo-alignment monomer A1 was synthesized as shown in the following scheme.

[Chemical Formula 9]

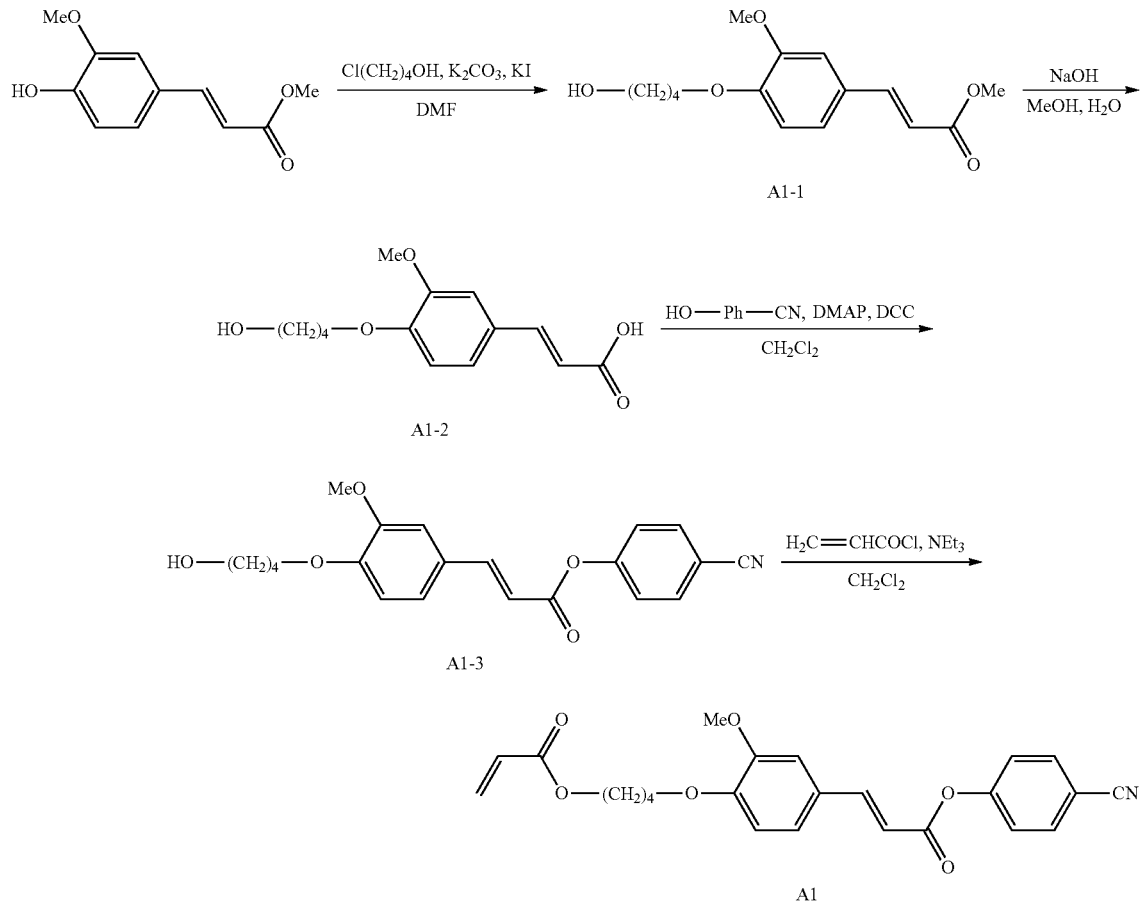

The weight of 20.8 g (100 mmol) of methyl ferulate and 11.9 g (110 mmol) of 4-chloro-1-butanol were dissolved in 150 mL of dimethylformamide in a 300-mL flask, 27.6 g (200 mmol) of potassium carbonate and 1.7 g (10 mmol) of potassium iodine were added thereto, and stirred at 70° C. for 12 hours under nitrogen atmosphere. The obtained reaction solution was filtered to remove impurities. To the filtrate, 200 mL of ethyl acetate and 300 mL of water were added to extract an organic layer, and the organic layer was further washed by 300 mL of water twice. The solvent was distilled off from the recovered organic layer, and a crude product of the compound (A1-1) was obtained thereby.

The crude product of the compound (A1-1) was dissolved in 200 mL of methanol, 100 mL of water and 4 g (100 mmol) of sodium hydroxide were added thereto, and stirred at 100° C. for 2 hours. After cooling the reaction solution, 2M-hydrochloric acid aqueous solution was added so as to be pH 2. The acid precipitated white precipitate was taken by filtering, further washed by 100 mL of water twice, and vacuum dried. The crude was subjected to recrystallization refinement by methanol so as to obtain 2.0 g of the compound (A1-2).

The weight of 13.3 g (50 mmol) of the compound (A1-2), 6.3 g (53 mmol) of 4-cyanophenol, and 250 mg (2 mmol) of dimethylaminopyridine were dissolved in 100 mL of dichloromethane and stirred at 5° C. Dropped thereinto was 20 mL dichloromethane solution of 11.3 g (55 mmol) of N,N'-dicyclohexylcarbodiimide, taking approximately 20 minutes, and the solution was stirred for 12 hours. The obtained reaction solution was filtered to remove impurities, thereafter methanol was added to the filtrate to precipitate crystals, and the crystals taken by filtering were vacuum dried to thereby obtain 17.1 g of the compound (A1-3).

The weight of 14.7 g (40 mmol) of the compound (A1-3), 0. g (4 mmol) of di-t-butyl-hydroxytoluene, and 16.2 g (160 mmol) of triethylamine were dissolved in 150 mL of dichloromethane and stirred under ice cooling. Dropped thereinto was 7.2 g (80 mmol) of acryloyl chloride, and the solution was stirred while keeping 5° C. or less. The weight of 2.4 g (20 mmol) of dimethylaminopyridine and 150 mL of water were added to the obtained reaction solution to extract an organic layer. In addition, the organic layer was washed twice by 150 mL of 1N-hydrochloric acid aqueous solution and 150 mL of water. Crystals were precipitated by adding 200 mL of methanol to the organic layer, and the crystals taken by filtering were vacuum dried to obtain 12.8 g of the compound (A1).

Synthesis Example 2

Synthesis of Photo-Alignment Monomer A2

A photo-alignment monomer A2 was synthesized as shown in the following scheme.

[Chemical Formula 10]

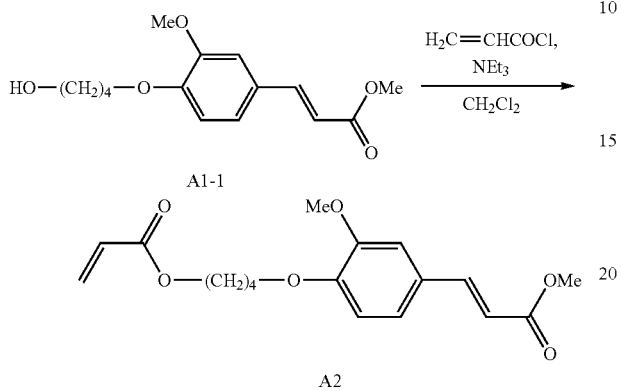

A photo-alignment monomer A2 was synthesized in the same manner as the synthesis of A1 in Synthesis Example 1 by using the compound A1-1.

Synthesis Example 3

Synthesis of Photo-Alignment Monomer A3

A photo-alignment monomer A3 was synthesized as shown in the following scheme.

[Chemical Formula 11]

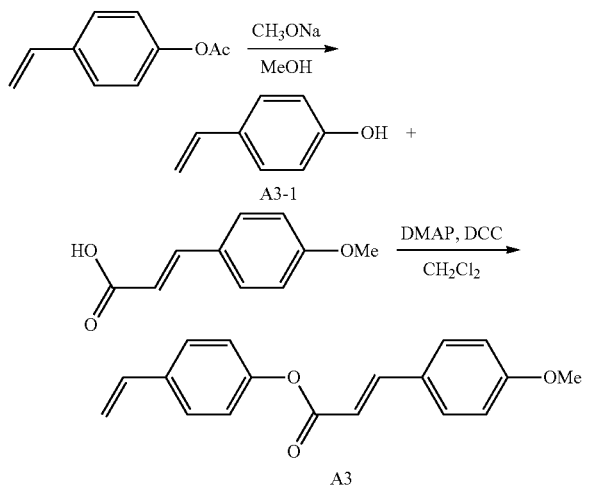

The weight of 20.0 g (118 mmol) of para-acetoxystyrene was dissolved in 200 mL of ethyl acetate in a 200 mL flask under nitrogen atmosphere, and 9.08 g (47.1 mmol) of sodium methoxide was slowly dropped thereinto taking approximately 30 minutes. After stirring for one and a half hours, the finish of the reaction was confirmed by TLC. Added to the reaction solution was 150 mL of 1N-hydrochloric acid aqueous solution so as to extract an organic layer, and thereafter the organic layer was further washed three times by 200 mL of water. The solvent was distilled off from the recovered organic layer, and a crude product of the compound (A3-1) was obtained thereby.

The weight of 12.1 g (100 mmol) of the compound (A3-1), 18.7 g (105 mmol) of 4-methoxycinnamate, and 0.5 g (4 mmol) of dimethylaminopyridine were dissolved in 300 mL of dichloromethane and stirred at 5° C. Slowly dropped thereinto was 40 mL dichloromethane solution of 22.7 g (110 mmol) of N,N'-dicyclohexylcarbodiimide, taking approximately 30 minutes, and stirred for 12 hours. The obtained reaction solution was filtered to remove impurities and thereafter methanol was added to the filtrate to precipitate crystals. The obtained crystals were separated by filtering and dried to obtain 26.6 g of the compound (A3).

Synthesis Example 4

Synthesis of Thermal Cross-Linkable Monomer B3

The compound (B3) was synthesized in accordance with the description in the document (Polymer Journal (2012) 44, 594-599).

Synthesis Example 5

Synthesis of Thermal Cross-Linkable Monomer B7

The weight of 14.0 g (118 mmol) of the compound (A3-1) was dissolved in 100 ml of dimethylformamide in a 200 mL flask under nitrogen atmosphere and ice cooling, 7.07 g (177 mmol) of sodium hydroxide was added thereto and stirred for 15 minutes, thereafter 14.1 g (130 mmol) of 4-chlorobutanol was dropped thereinto over approximately 10 minutes. After stirring for 16 hours, the finish of the reaction was confirmed by TLC to extract by ethyl acetate, thereafter washed by 1N-hydrochloric acid, pure water, and saturated salt solution, and dried by sodium sulfate. The solvent was distilled off and dried to thereby obtain 18.6 g of the thermal cross-linkable monomer B7.

Synthesis Example 6

Synthesis of Thermal Cross-Linkable Monomer B8

The thermal cross-linkable monomer B8 was synthesized in the same manner as in Synthesis Example 5 by using 6-chlorohexanol.

Synthesis Example 7

Synthesis of Thermal Cross-Linkable Monomer B9

The thermal cross-linkable monomer B9 was synthesized in the same manner as in Synthesis Example 5 by using 11-bromo undecanol.

Synthesis Example 8

Synthesis of Thermal Cross-Linkable Monomer B10

The weight of 20.15 g (136 mmol) of 4-vinyl benzoate, 13.9 g (118 mmol) of 1,6-hexandiol, and 0.458 g (3.82 mmol) of dimethylaminopyridine were dissolved in 200 mL of dichloromethane in a 300 mL flask under ice cooling, and 28.0 g (136 mmol) of N, N'-dicyclohexylcarbodiimide dissolved in 40 mL of dichloromethane was dropped thereinto over approximately 10 minutes. After stirring for 15 hours, the reaction solution was cooled to filter out the precipitate. The solvent was distilled off and methanol was added to obtain 24.1 g of the thermal cross-linkable monomer B10 by recrystallization.

The constitution of each monomer is shown in the following Tables 1 and 2.

A chemical constitution of each synthesized monomer was confirmed by 1H NMR measurement with the use of JEOL JNM-LA400WB manufactured by JEOL Ltd.

TABLE 1

Photo-alignment monomer (A)

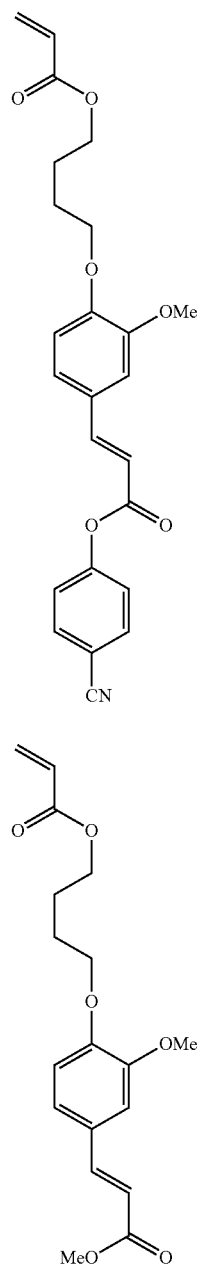

TABLE 1-continued

Photo-alignment monomer (A)

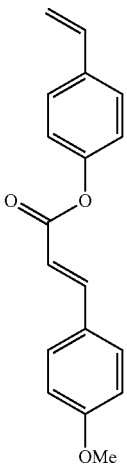 [SMILES: C=Cc1ccc(OC(=O)/C=C/c2ccc(OC)cc2)cc1]

TABLE 2

Thermal cross-linkable monomer (B)

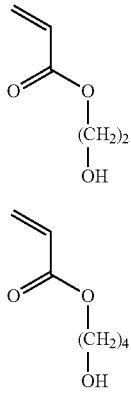

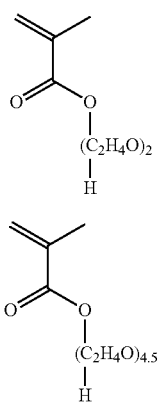

TABLE 2-continued

Thermal cross-linkable monomer (B)

B6 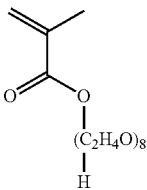

B7 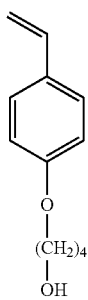

B8 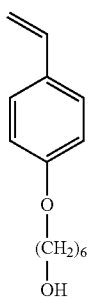

B9 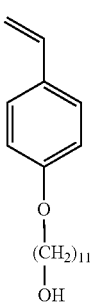

TABLE 2-continued

Thermal cross-linkable monomer (B)

B10 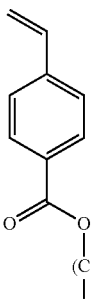

Production Example 1

Synthesis of Copolymer 1

The weight of 0.8 g (2 mmol) of the photo-alignment monomer (A1), 2.6 g (18 mmol) of the thermal cross-linkable monomer (B2), and 50 mg (0.3 mmol) of α,α'-azobisisobutyronitrile (AIBN) as a polymerization catalyst were dissolved in 25 ml of dioxane, and reacted at 90° C. for 6 hours. After the finish of the reaction, the solution was purified by a reprecipitation method to thereby obtain a copolymer 1.

Production Examples 2 to 23

Synthesis of Copolymers 2 to 23

The copolymers 2 to 23 were synthesized in the same manner as in Production Example 1 by using the photo-alignment monomer shown in Table 1, the thermal cross-linkable monomer shown in Table 2, and another monomer as required.

Comparative Production Examples 1 and 2

Synthesis of Comparative Copolymers 1 and 2

Comparative copolymers 1 and 2 were synthesized in the same manner as in Production Example 1 by using the photo-alignment monomer shown in Table 1 and the thermal cross-linkable monomer shown in Table 2.

Each of the copolymers is shown in the following Table 3.

The number-average molecular weight (hereinafter referred to as Mn) of each synthesized copolymers was calculated by gel permeation chromatography (GPC) with the use of HLC-8220 GPC manufactured by Tosoh Corporation while regarding polystyrene as a standard reference material and NMP as an eluant.

TABLE 3

| | Photo-alignment monomer | | Thermal cross-linkable monomer | | Other monomers | | |
|---|---|---|---|---|---|---|---|
| | | Addition amount (mmol) | | Addition amount (mmol) | | Addition amount (mmol) | Mn |
| Production Example 1 | A1 | 2 | B2 | 18 | | | 28600 |
| Production Example 2 | A1 | 6 | B2 | 14 | | | 22300 |

TABLE 3-continued

| | Photo-alignment monomer | Addition amount (mmol) | Thermal cross-linkable monomer | Addition amount (mmol) | Other monomers | Addition amount (mmol) | Mn |
|---|---|---|---|---|---|---|---|
| Production Example 3 | A1 | 10 | B2 | 10 | | | 27500 |
| Production Example 4 | A1 | 14 | B2 | 6 | | | 19900 |
| Production Example 5 | A1 | 10 | B2 | 10 | | | 3800 |
| Production Example 6 | A1 | 10 | B2 | 10 | | | 65400 |
| Production Example 7 | A1 | 9 | B2 | 9 | methylmethacrylate | 2 | 27800 |
| Production Example 8 | A1 | 9 | B2 | 9 | styrene | 2 | 23500 |
| Production Example 9 | A1 | 10 | B3 | 10 | | | 29600 |
| Production Example 10 | A1 | 10 | B4 | 10 | | | 16500 |
| Production Example 11 | A1 | 10 | B5 | 10 | | | 18100 |
| Production Example 12 | A1 | 10 | B7 | 10 | | | 28200 |
| Production Example 13 | A1 | 10 | B8 | 10 | | | 16500 |
| Production Example 14 | A1 | 10 | B9 | 10 | | | 24600 |
| Production Example 15 | A1 | 10 | B10 | 10 | | | 35100 |
| Production Example 16 | A2 | 10 | B2 | 10 | | | 14800 |
| Production Example 17 | A2 | 10 | B4 | 10 | | | 24900 |
| Production Example 18 | A2 | 10 | B7 | 10 | | | 18800 |
| Production Example 19 | A2 | 10 | B10 | 10 | | | 32100 |
| Production Example 20 | A3 | 10 | B2 | 10 | | | 41100 |
| Production Example 21 | A3 | 10 | B4 | 10 | | | 25100 |
| Production Example 22 | A3 | 10 | B7 | 10 | | | 32500 |
| Production Example 23 | A3 | 10 | B10 | 10 | | | 26700 |
| Comparative Production Example 1 | A1 | 10 | B1 | 10 | | | 31100 |
| Comparative Production Example 2 | A1 | 10 | B6 | 10 | | | 26900 |

Example 1

Preparation of Thermosetting Composition 1

A thermosetting composition 1 with the composition described below was prepared.
Copolymer 1: 0.1 g
hexamethoxymethylmelamine (HMM): 0.01 g
para-toluenesulfonic acid monohydrate (PISA): 0.0015 g
propylene glycol monomethyl ether (PGME): 2.1 g
(Formation of Alignment Layer)
The thermosetting composition prepared in Example 1 was applied to one plane of a transparent glass substrate by spin coat, and heated and dried in an oven of 90° C. for 1 minute to form a cured film and obtain a coating film. This cured film surface was irradiated with polarized ultraviolet rays including emission lines of 313 nm, at 20 mJ/cm2 in a vertical direction to the substrate normal line, by using an Hg—Xe lamp and a Glan Taylor prism to thereby form an alignment layer.
(Production of Retardation Plate)
A photo-polymerization initiator IRGACURE™ 184 manufactured by BASF was added by 5% by mass to a solution in which the liquid crystalline monomer represented by the following formula was dissolved in cyclohexanone so as to be a solid content of 15% by mass to prepare a polymerizable liquid crystal composition.

[Chemical Formula 12]

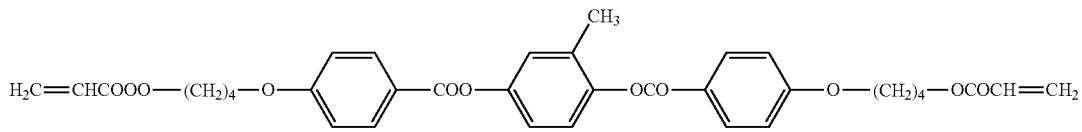

The polymerizable liquid crystal composition was applied by spin coat to a plane, on which the alignment layer of the transparent glass substrate was formed, and heated in an oven of 70° C. for 1 minute to form a coating film. In this substrate, the polymerizable liquid crystal composition applied surface was irradiated with 300 mJ/cm2 of unpolarized ultraviolet rays including emission lines of 365 nm, under a nitrogen atmosphere, by using an Hg—Xe lamp, to produce a retardation plate.

Examples 2 to 27 and Comparative Examples 1 to 4

A thermosetting composition of Examples 2 to 27 and Comparative Examples 1 to 4 was prepared in the same manner as in Example 1 by using hexamethoxymethylmelamine (HMM) or 1,3,4,6-tetrakis(methoxymethyl)glycoluril (TMGU) as the cross-linking agent, para-toluenesulfonic acid monohydrate (PTSA) as the acid or the acid generator, and propylene glycol monomethyl ether (PGME) as the solvent to form an alignment layer and produce a retardation plate.

The composition of each thermosetting composition is shown in the following Table 4.

[Evaluations]

The following evaluations were conducted for each obtained retardation plate.

(Liquid Crystal Alignment Property)

Two sheets of linear polarizing plates were made into a crossed Nicol state to hold a retardation plate therebetween, which was visually observed. On the occasion of rotating the substrate, the evaluation was conducted while regarding the case that a light and dark pattern observed in the plane is clear as "□", and the case that alignment defect is observed as "□".

TABLE 4

|  | Copolymer | part by mass | Cross-linking agent | part by mass | Acid | part by mass | Solvent | part by mass | Evaluation result Alignment property | Curing temperature (° C.) |
|---|---|---|---|---|---|---|---|---|---|---|
| Example 1 | Copolymer 1 | 0.1 | HMM | 0.01 | PTSA | 0.0015 | PGME | 2.1 | ○ | 90 |
| Example 2 | Copolymer 1 | 0.1 | HMM | 0.03 | PTSA | 0.0015 | PGME | 2.1 | ○ | 90 |
| Example 3 | Copolymer 1 | 0.1 | HMM | 0.05 | PTSA | 0.0015 | PGME | 2.1 | ○ | 90 |
| Example 4 | Copolymer 1 | 0.1 | TMGU | 0.01 | PTSA | 0.0015 | PGME | 2.1 | ○ | 90 |
| Example 5 | Copolymer 1 | 0.1 | HMM | 0.01 | PTSA | 0.005 | PGME | 2.1 | ○ | 90 |
| Example 6 | Copolymer 2 | 0.1 | HMM | 0.01 | PTSA | 0.0015 | PGME | 2.1 | ○ | 90 |
| Example 7 | Copolymer 3 | 0.1 | HMM | 0.01 | PTSA | 0.0015 | PGME | 2.1 | ○ | 90 |
| Example 8 | Copolymer 4 | 0.1 | HMM | 0.01 | PTSA | 0.0015 | PGME | 2.1 | ○ | 90 |
| Example 9 | Copolymer 5 | 0.1 | HMM | 0.01 | PTSA | 0.0015 | PGME | 2.1 | ○ | 90 |
| Example 10 | Copolymer 6 | 0.1 | HMM | 0.01 | PTSA | 0.0015 | PGME | 2.1 | ○ | 90 |
| Example 11 | Copolymer 7 | 0.1 | HMM | 0.01 | PTSA | 0.0015 | PGME | 2.1 | ○ | 90 |
| Example 12 | Copolymer 8 | 0.1 | HMM | 0.01 | PTSA | 0.0015 | PGME | 2.1 | ○ | 90 |
| Example 13 | Copolymer 9 | 0.1 | HMM | 0.01 | PTSA | 0.0015 | PGME | 2.1 | ○ | 90 |
| Example 14 | Copolymer 10 | 0.1 | HMM | 0.01 | PTSA | 0.0015 | PGME | 2.1 | ○ | 90 |
| Example 15 | Copolymer 11 | 0.1 | HMM | 0.01 | PTSA | 0.0015 | PGME | 2.1 | ○ | 90 |
| Example 16 | Copolymer 12 | 0.1 | HMM | 0.01 | PTSA | 0.0015 | PGME | 2.1 | ○ | 90 |
| Example 17 | Copolymer 13 | 0.1 | HMM | 0.01 | PTSA | 0.0015 | PGME | 2.1 | ○ | 90 |
| Example 18 | Copolymer 14 | 0.1 | HMM | 0.01 | PPTS | 0.0015 | PGME | 2.1 | ○ | 90 |
| Example 19 | Copolymer 15 | 0.1 | HMM | 0.01 | PPTS | 0.0015 | PGME | 2.1 | ○ | 90 |
| Example 20 | Copolymer 16 | 0.1 | HMM | 0.01 | PTSA | 0.0015 | PGME | 2.1 | ○ | 90 |
| Example 21 | Copolymer 17 | 0.1 | HMM | 0.01 | PTSA | 0.0015 | PGME | 2.1 | ○ | 90 |
| Example 22 | Copolymer 18 | 0.1 | HMM | 0.01 | PTSA | 0.0015 | PGME | 2.1 | ○ | 90 |
| Example 23 | Copolymer 19 | 0.1 | HMM | 0.01 | PTSA | 0.0015 | PGME | 2.1 | ○ | 90 |
| Example 24 | Copolymer 20 | 0.1 | HMM | 0.01 | PTSA | 0.0015 | PGME | 2.1 | ○ | 90 |
| Example 25 | Copolymer 21 | 0.1 | HMM | 0.01 | PTSA | 0.0015 | PGME | 2.1 | ○ | 90 |
| Example 26 | Copolymer 22 | 0.1 | HMM | 0.01 | PTSA | 0.0015 | PGME | 2.1 | ○ | 90 |
| Example 27 | Copolymer 23 | 0.1 | HMM | 0.01 | PTSA | 0.0015 | PGME | 2.1 | ○ | 90 |
| Comparative Example 1 | Comparative copolymer 1 | 0.1 | HMM | 0.01 | PTSA | 0.0015 | PGME | 2.1 | x | 90 |
| Comparative Example 2 | Comparative copolymer 1 | 0.1 | HMM | 0.03 | PTSA | 0.0015 | PGME | 2.1 | x | 90 |
| Comparative Example 3 | Comparative copolymer 1 | 0.1 | HMM | 0.01 | PTSA | 0.005 | PGME | 2.1 | x | 90 |
| Comparative Example 4 | Comparative copolymer 2 | 0.1 | HMM | 0.01 | PTSA | 0.0015 | PGME | 2.1 | x | 90 |

Low temperature curing was possible in any of the cases using the thermosetting compositions of Examples 1 to 27.

The invention claimed is:

1. A thermosetting composition with a photo-alignment property, comprising:
    a copolymer containing a photo-alignment constitutional unit, and a thermal cross-linking constitutional unit in which a thermal cross-linking group is connected to a backbone of the copolymer via a straight-chain alkylene group with a carbon number of 4 to 11, or via a polyethylene glycol group having 2 to 5 repeating units; and
    the thermal cross-linking constitutional unit includes a constitutional unit represented by the formula:

wherein $Z^1$ is a monomer unit represented by any one of the following:

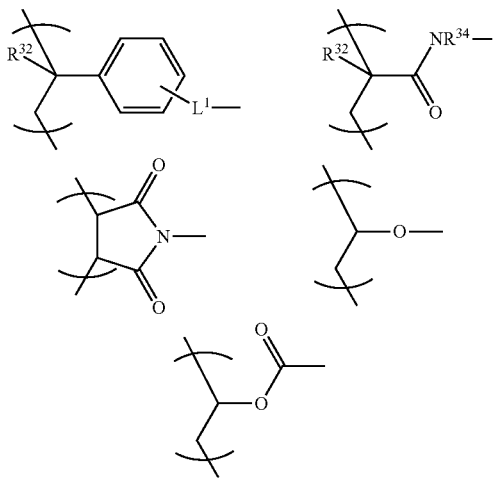

wherein $R^{32}$ represents a hydrogen atom or a methyl group, $L^1$ represents a single bond, an ether linkage, a thioether linkage, an ester linkage, a thioester linkage, a carbonyl linkage, or a thiocarbonyl linkage, $R^{33}$ represents a hydrogen atom, a methyl group, a chlorine atom, or a phenyl group, $R^{34}$ represents a hydrogen atom or a lower alkyl group, and when $L^1$ is a single bond, $Y^1$ is directly bonded to a styrene skeleton,
$Y^1$ represents the straight-chain alkylene group or the polyethylene glycol group, and
the thermal cross-linking group is bonded to a constitutional unit $Z^1$ via $Y^1$.

2. The thermosetting composition with a photo-alignment property according to claim 1, wherein the thermal cross-linking group is selected from the group consisting of a hydroxy group, a carboxy group, a mercapto group, a glycidyl group, and an amide group.

3. The thermosetting composition with a photo-alignment property according to claim 1, further comprising a cross-linking agent.

4. The thermosetting composition with a photo-alignment property according to claim 1, wherein the thermal cross-linking group is a hydroxy group.

5. The thermosetting composition with a photo-alignment property according to claim 1, wherein the thermal cross-linking constitutional unit contains —(CH2)n-OH or —(C2H4O)m-H, provided that "n" is 4 to 11 and "m" is 2 to 5.

6. The thermosetting composition with a photo-alignment property according to claim 1, wherein the photo-alignment group of the photo-alignment constitutional unit is a functional group for causing a photo-dimerization reaction or a photo-isomerization reaction.

7. The thermosetting composition with a photo-alignment property according to claim 1, wherein the photo-alignment group of the photo-alignment constitutional unit is a cinnamoyl group.

8. A substrate with an alignment layer comprising a substrate, and the alignment layer disposed on the substrate and formed from the thermosetting composition with a photo-alignment property according to claim 1.

9. An alignment layer comprising a copolymer including a photo-alignment constitutional unit, a thermal cross-linking constitutional unit in which a thermal cross-linking group is connected to a backbone of the copolymer via a straight-chain alkylene group with a carbon number of 4 to 11 or via a polyethylene glycol group having 2 to 5 repeating units, and a cross-linking structure, the alignment layer comprising a photo-dimerization structure or a photo-isomerization structure of a photo-alignment group in the photo-alignment constitutional unit; and
    the thermal cross-linking constitutional unit includes a constitutional unit represented by the formula:

wherein $Z^1$ is a monomer unit represented by any one of the following:

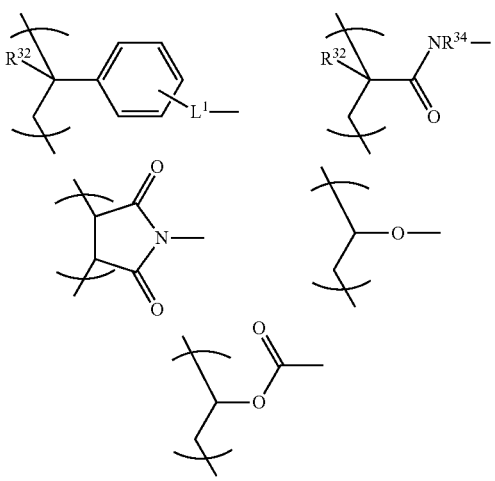

wherein $R^{32}$ represents a hydrogen atom or a methyl group, $L^1$ represents a single bond, an ether linkage, a thioether linkage, an ester linkage, a thioester linkage, a carbonyl linkage, or a thiocarbonyl linkage, $R^{33}$ represents a hydrogen atom, a methyl group, a chlorine atom, or a phenyl group, $R^{34}$ represents a hydrogen atom or a lower alkyl group, and when $L^1$ is a single bond, $Y^1$ is directly bonded to a styrene skeleton, $Y^1$ represents the straight-chain alkylene group or the polyethylene glycol group, and the thermal cross-linking group is bonded to a constitutional unit $Z^1$ via $Y^1$, and the photo-alignment group of the photo-alignment constitutional unit includes the photo-dimerization structure or the photo-isomerization structure.

10. The alignment layer according to claim 9 wherein the thermal cross-linking group is selected from the group consisting of a hydroxy group, a carboxy group, a mercapto group, a glycidyl group, and an amide group.

11. A substrate with an alignment layer comprising a substrate, and the alignment layer according to claim 9, disposed on the substrate.

12. The substrate with an alignment layer according to claim 11, wherein the substrate is a resin substrate.

13. A retardation plate comprising a substrate, the alignment layer according to claim 9, disposed on the substrate, and a retardation layer disposed on the alignment layer.

14. A device comprising the alignment layer according to claim 9.

* * * * *